US008527076B2

(12) United States Patent
Shimizu

(10) Patent No.: US 8,527,076 B2
(45) Date of Patent: Sep. 3, 2013

(54) CONTROL APPARATUS FOR MUSIC SYSTEM COMPRISING A PLURALITY OF EQUIPMENTS CONNECTED TOGETHER VIA NETWORK, AND INTEGRATED SOFTWARE FOR CONTROLLING THE MUSIC SYSTEM

(75) Inventor: Masahiro Shimizu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 679 days.

(21) Appl. No.: 12/405,149

(22) Filed: Mar. 16, 2009

(65) Prior Publication Data

US 2009/0177304 A1 Jul. 9, 2009

Related U.S. Application Data

(62) Division of application No. 11/394,027, filed on Mar. 29, 2006, now Pat. No. 7,620,468.

(30) Foreign Application Priority Data

Mar. 31, 2005 (JP) ................................ 2005-100762
Nov. 18, 2005 (JP) ................................ 2005-334808
Nov. 21, 2005 (JP) ................................ 2005-336035
Nov. 21, 2005 (JP) ................................ 2005-336036

(51) Int. Cl.
*G06F 17/00* (2006.01)

(52) U.S. Cl.
USPC ............................................ 700/94; 381/119

(58) Field of Classification Search
USPC ........................................................... 700/94
See application file for complete search history.

(56) References Cited

U.S. PATENT DOCUMENTS 5,845,152 A 12/1998 Anderson et al.
5,862,231 A 1/1999 Tokuhisa
5,982,828 A 11/1999 Fujimori et al.

(Continued)

FOREIGN PATENT DOCUMENTS

JP 07-236200 A 9/1995
JP 10-32606 2/1998

(Continued)

OTHER PUBLICATIONS

DME_Designer cited portions: Copyright 2004.*

(Continued)

*Primary Examiner* — Paul McCord
(74) *Attorney, Agent, or Firm* — Morrison & Foerster LLP

(57) ABSTRACT

Control node includes: current memories provided in corresponding relation to a plurality of equipments to store, for each of the equipments, a first current data set for remote-controlling an operational condition of the equipment and a second current data set for remote-controlling a logical connection between the equipment and another equipment; and library memories provided in corresponding relation to the equipments to store, for each of the equipments, a plurality of first data sets each for remote-controlling the operational condition of the equipment and a plurality of second data sets each for remote-controlling the logical connection between the equipment and another equipment. In response to a scene readout instruction, first and second data sets, corresponding to the scene designated by the instruction, are read out from the library memories and stored into the current memories as first and second current data sets, and a readout command for the designated scene is transmitted, via a network, to each of the equipments.

11 Claims, 16 Drawing Sheets

(56) References Cited

U.S. PATENT DOCUMENTS

| | | | | |
|---|---|---|---|---|
| 6,239,346 | B1 | 5/2001 | Goto et al. | |
| 6,477,181 | B1 | 11/2002 | Fujimori et al. | |
| 7,191,023 | B2 | 3/2007 | Williams | |
| 7,242,990 | B2 | 7/2007 | Suyama et al. | |
| 7,620,468 | B2 | 11/2009 | Shimizu | |
| 2001/0021188 | A1 | 9/2001 | Fujimori et al. | |
| 2002/0082732 | A1 | 6/2002 | Suyama et al. | |
| 2002/0161865 | A1 | 10/2002 | Nguyen | |
| 2002/0193893 | A1 | 12/2002 | Li et al. | |
| 2004/0199276 | A1 | 10/2004 | Poon | |
| 2004/0254660 | A1 | 12/2004 | Seefeldt | |
| 2005/0159832 | A1 | 7/2005 | Umeo et al. | |
| 2005/0212802 | A1* | 9/2005 | Takeda et al. | 345/440 |
| 2005/0220038 | A1* | 10/2005 | Muto et al. | 370/257 |
| 2005/0234571 | A1 | 10/2005 | Holmes | |
| 2006/0248173 | A1 | 11/2006 | Shimizu | |
| 2009/0234479 | A1 | 9/2009 | Shimizu | |

FOREIGN PATENT DOCUMENTS

| | | |
|---|---|---|
| JP | 2001-203732 | 7/2001 |
| JP | 2005-202138 | 7/2005 |
| JP | 2005-266303 A | 9/2005 |

OTHER PUBLICATIONS

DME64_manual cited portions: Copyright 2004.*

Notice of Grounds for Rejection mailed Mar. 29, 2011, for JP Patent Application No. 2006-096061, with English Translation, six pages.

Notice of Grounds for Rejection mailed May 11, 2010, for JP Patent Application No. 2005-100762, with English Translation, 4 pages.

Clendeninn, Phil "mLAN System Setup (A Getting Started Power User Guide)", Yamaha Corporation of America, Pro Audio & Combo Division, pp. 1-13, C. 2004.

Digital Mixing Engine DME 32 Owner's Manual, Yamaha Corporation, Japan, C. 2000.

Studio Manager for DM2000 Owner's Manual, Yamaha Corporation, Japan, C. 2002.

Yamaha Corporation, DME Designer Version 2 manual, copyright 2004, downloadable from assignees website at http://www2.yamaha.co.jp/manual/pdf/pa/english/signal/dmedesigner_en_om.pdf.

Partial European Search Report mailed Oct. 26, 2011, for EP Application No. 06111764.4, eight pages.

Yamaha. (2004). Digital Mixing Engine DME64N/DME24N Owner's Manual, located at http://www2.yamaha.co.jp/manual/pdf/pa/english/signal/dme64n_en_om.pdf, last visited Sep. 20, 2011, pp. 1-76.

European Search Report mailed Dec. 5, 2011, for EP Application No. 11185531.8, five pages.

Notification of the First Office Action mailed Jul. 26, 2011, for CN Patent Application No. 201010566190.5, with English Translation, 14 pages.

Yamaha. (2004). Digital Mixing Engine DME64N/DME24N Owner's Manual, located at http://wvvw.yamahaproaudio.com/global/en/downloads/manuals/?downloadLanguage=en&dow nloadProduct=DME64N&search_type=, last visited Nov. 14, 2011, pp. 1-80.

Yamaha. (2005). DME Designer V1.1.0 for Windows, located at <http://www.yamahaproaudio.com/global/en/downloads/firmware_software/sp2060/dme_des110.jsp>, last visited Nov. 14, 2011, 378 pages. (submitted in three parts.).

Chinese Office Action mailed Jul. 3, 2012, for CN Patent Application No. 201010566160.4, with English Translation, seven pages.

Anonymous. (Jun. 27, 2003). Audia™ Digital Audio Platform Operation Manual, BIAMP™, 136 pages.

EP Examination report dated Feb. 1, 2013, for European Patent Application No. 06 111 764.4, Applicant Yamaha Corporation, 6 pages.

EP Examination report dated Mar. 21, 2013 for European Patent Application No. 11 185 531.8, Applicant: Yamaha Corporation, 5 pages.

* cited by examiner

CONTROL APPARATUS FOR MUSIC SYSTEM COMPRISING A PLURALITY OF EQUIPMENTS CONNECTED TOGETHER VIA NETWORK, AND INTEGRATED SOFTWARE FOR CONTROLLING THE MUSIC SYSTEM

CROSS-REFERENCE TO RELATED APPLICATIONS

This is a divisional of U.S. patent application Ser. No. 11/394,027 filed Mar. 29, 2006, which in turn claims priority from Japanese Patent application No. 2005-100762 filed Mar. 31, 2005, Japanese Patent application No. 2005-334808 filed Nov. 18, 2005, Japanese Patent application No. 2005-336035 filed Nov. 21, 2005 and Japanese Patent application No. 2005-336036 filed Nov. 21, 2005, which applications are specifically incorporated in their entirety by reference herein.

BACKGROUND OF THE INVENTION

The present invention relates to an improved control apparatus for remote-controlling respective operational conditions, logical connections, etc. of a plurality of equipments in a music system where the equipments are connected together via a network, as well as improved integrated software for remote-controlling the operational conditions, logical connections, etc. of the equipments in the music system.

In the fields of networks constructed in accordance with a predetermined multimedia-compliant communications standard (e.g., IEEE1394), there have been known music systems arranged to transmit and receive (i.e., communicate) waveform data (e.g., audio waveform sample data) and performance data (e.g., performance event data, such as MIDI data); among examples of such music systems is a music system developed by the assignee of the instant application and called by its trademark "mLAN". In such music systems, each comprising a plurality of nodes, such as a control apparatus like a personal computer and various music equipments (e.g., synthesizer, tone generator device, recorder and mixer), are connected together, waveform data and MIDI data can be transferred from a given one of the nodes to any other desired one of the nodes in real time. Among various examples of techniques pertaining to the music systems is one disclosed in Japanese Patent Application Laid-open Publication No. HEI-10-32606 (hereinafter referred to as "Patent Literature 1") which corresponds to U.S. Pat. No. 6,477,181.

Equipments for connecting between input and output lines of various music equipments, such as a keyboard, sequencer and mixer, are commonly known as "patch bays". Invention concerning a virtual patch bay for logically setting a desired connection between equipments (nodes) interconnected via a network as noted above is disclosed in Japanese Patent Application Laid-open Publication No. 2001-203732 (hereinafter referred to as "Patent Literature 2") which corresponds to U.S. Patent publication No. US-2001-021188-A1. Music data are transmitted from an output-side node to an input-side node via the logical connection set by the patch bay.

In the aforementioned conventional music systems, however, merely connecting a music equipment to the network can achieve no logical connection of the music equipment in the network, so that no data can be transmitted and received to and from the music equipment. In order to allow data to be transmitted and received to and from such a music equipment newly connected to the network, a patch bay application program, as disclosed in patent literature 2, is activated, on a personal computer connected to the network, to set an appropriate logical connection of the music equipment.

Performing setting of operational parameters etc. of various music equipments by a user operating a graphic screen via a personal computer and GUI in a network is known as "remote control". Software for such remote control is provided separately for each of the types of the music equipments, as shown in an instruction manual of Studio Manager for DM2000 (trademark), instruction manual of XG Editor (trademark) and instruction manual of DME Manager (trademark) (which are instruction manuals of commercially-available software and will hereinafter be referred to as "Non-patent Literature 1, "Non-patent Literature 2" and "Non-patent Literature 3", respectively). According to the above-mentioned remote controlling software, operational parameter memory areas, similar in structure to memory areas provided in the individual music equipments (that are to be controlled) for storing operational parameters, are provided in the personal computer, and a screen is displayed, on the graphic screen of the personal computer, for editing various operational parameters of the individual music equipments to be controlled. As a user performs editing operation on the editing screen, an operational parameter corresponding to the editing operation is updated in the operational parameter memory area of the personal computer. In this way, editing operation on various operational parameters in the individual music equipments can be emulated on the computer. Further, by the updated contents of the operational parameters being sequentially exchanged between the personal computer and the individual music equipments in the network, identity of the operational parameters can be maintained in the respective memory areas of the personal computer and individual music equipments.

Further, each of the music equipments, such as a mixer and effector, has a scene store/scene recall function of collectively storing current settings of operational parameters (e.g., settings of various switches and operators) as a setting file of a "scene" and calling and reproducing the stored "scene". Such a scene store/scene recall function too can be executed, for each of the music equipments, on the computer using the remote controlling software. However, because a different remote controlling software is provided for each type of music equipment as noted above, the equipments of different types can not be controlled simultaneously or collectively. In this regard, Japanese Patent Application Laid-open Publication No. 2005-202138 (hereinafter referred to as "Patent Literature 3") corresponding to U.S. Patent publication No. US-2005-159832-A1 discloses collectively remote-controlling a plurality of equipments in a network, using a software program intended to collectively manage the remote control of the individual equipments.

However, setting, change, etc. of the logical connections between the music equipments in the music network is controlled via dedicated connection setting software (patch bay software) separate from the remote controlling software as noted above, and thus, different types of equipments can not be controlled simultaneously in terms of setting, change, etc. of the logical connections. Therefore, the remote control of the individual equipments by the personal computer and the control for synchronizing the individual equipments (actual equipments) in the music system (i.e., control for achieving coincidence or agreement in operational parameter between the personal computer and the equipments and agreement in logical connection setting between the individual equipments) can not be performed collectively for all of the equipments and has to be performed separately for each of the equipments.

SUMMARY OF THE INVENTION

In view of the foregoing, it is an object of the present invention to provide a control apparatus which, in a music system comprising a plurality of equipments connected together via a network, can collectively perform setting of operational conditions and logical connections of the individual equipments and, in particular, scene store/scene recall to and from the individual equipments, or a software program for causing a computer to function as such a control apparatus.

According to another aspect, it is an object of the present invention to provide a control apparatus which, in a music system comprising a plurality of equipments connected together via a network, allows operational conditions and logical connections of the individual equipments to be set with ease, or a software program for causing a computer to function as such a control apparatus.

In order to accomplish the above-mentioned objects, the present invention provides an improved control apparatus for, in a music system comprising a plurality of equipments connected together via a network and the control apparatus, remote-controlling settings of the plurality of equipments via the network, and the control apparatus comprises: current memories provided, in corresponding relation to the equipments, to store, for each of the equipments, a first current data set for remote-controlling an operational condition of the equipment and a second current data set for remote-controlling a logical connection between the equipment and another one of the equipments; library memories provided, in corresponding relation to the equipments, to store, for each of the equipments, a plurality of first data sets each for remote-controlling the operational condition of the equipment and a plurality of second data sets each for remote-controlling the logical connection between the equipment and another one of the equipments; and a scene control section that performs scene readout control in accordance with a readout instruction for reading out a scene, the scene readout control including: reading out the first and second data sets, corresponding to a scene designated by the readout instruction, stored in the library memories for individual ones of the equipments; storing the read-out first and second data sets into corresponding ones of the current memories for the individual equipments as the first and second current data sets; and transmitting a readout command for the designated scene to the individual equipments in the music system, to allow the control apparatus and the plurality of equipments to collectively perform readout of the scene.

In the control apparatus of the present invention, for each of the equipments, a first current data set for remote-controlling an operational condition of the equipment and a second current data set for remote-controlling a logical connection between the equipment and another one of the equipments are stored in the current memory for that equipment, and a plurality of first data sets each for remote-controlling the operational condition of the equipment and a plurality of second data sets each for remote-controlling the logical connection between the equipment and another one of the equipments are stored in the library memory for the equipment. In scene readout (scene recall), the first and second data sets, corresponding to a scene designated by a readout instruction, are read out from the library memories for the individual equipments and stored into corresponding ones of the current memories for the individual equipments as the first and second current data sets, and a readout command for the designated scene is transmitted to the individual equipments in the music system. In this way, the operational conditions (first data set) and logical connections (second data set) in the plurality of equipments can be recalled collectively. Because not only the operational conditions but also the logical connection conditions or states can be recalled, the present invention permits collective scene recall for the plurality of equipments and hence the entire music network. Therefore, in the music system comprising the plurality of equipments connected via the network, the present invention affords the superior benefit that the respective operation and logical connections of the equipments and scene recall control in particular can be set with an increased ease.

The scene control section may further performs scene write control in accordance with a write instruction for writing a scene, the scene write control including: writing the first and second current data sets, stored in the current memories for the individual equipments, into corresponding ones of the library memories for the individual equipments as the first and second data sets and in association with the scene designated by the write instruction; and transmitting a write command for the designated scene to each of the equipments in the music system, to allow the control apparatus and the plurality of equipments to collectively perform writing of the scene. With such scene write control (i.e., scene store control), the present invention allows the operational conditions of the equipments and logical connections between the equipments to be stored collectively, and thus, the present invention permits collective scene recall for the plurality of equipments and hence the entire music network.

According to still another aspect of the present invention, there is provided an improved music system comprising a plurality of equipments connected together via a network and a control apparatus that remote-controls settings of the plurality of equipments via the network. In the music system, each of the equipments comprises: a local current memory that stores a first current data set for controlling a current operational condition of the equipment and a second current data set for controlling a logical connection between the equipment and another one of the equipments; a local library memory that stores a plurality of first data sets each for controlling the operational condition of the equipment and a plurality of second data sets each for controlling a logical connection between the equipment and another one of the equipments; and a local scene control section that, in response to the readout instruction transmitted by the control apparatus, reads out the first and second data sets, corresponding the scene designated by the readout instruction, stored in the local library memory of the equipment and stores the read-out first and second data sets into the local current memory of the equipment as the first and second current data sets. Further, in the music system, the control apparatus comprises: current memories provided in corresponding relation to the equipments to store, for each of the equipments, a first current data set for remote-controlling the operational condition of the equipment and a second current data set for remote-controlling a logical connection between the equipment and another one of the equipments; library memories provided in corresponding relation to the equipments to store, for each of the equipment, a plurality of the first data sets each for remote-controlling the operational condition of the equipment and a plurality of the second data sets each for remote-controlling the logical connection between the equipment and another one of the equipments; and a scene control section that performs scene readout control in accordance with a readout instruction for reading out a scene, the scene readout control including: reading out the first and second data sets, corresponding to a scene designated by the readout instruction, stored in the library memories for individual ones of the equipments; storing the read-out first and second data sets into corresponding ones of the current memories for the individual equipments as the first and second current data sets; and transmitting a readout command for the designated scene to the individual equipments in the music system, to allow the control apparatus and the plurality of equipments to collectively perform readout of the scene.

Thus, with the music system, respective operational conditions of music equipments connected together to a network and logical connections between the music equipments in the network can be collectively reproduced through remote control, in response to a scene readout (i.e., scene recall) instruction generated by the control apparatus.

According to still another aspect of the present invention, there is provided an improved control apparatus for, in a music system comprising a plurality of equipments connected together via a network and the control apparatus, remote-controlling logical connections of the plurality of equipments via the network, each of the equipments in the music system being capable of implementing a module formed by software to perform a predetermined function, and the control apparatus of the invention comprises: a display; a remote control section that executes various control modules for remote-controlling settings and logical connection conditions of the modules implemented by individual ones of the equipments in the music system; a display control section that causes the display to graphically display images indicative of the modules implemented by the individual equipments in the music system and images indicative of the logical connection conditions between the modules; an operation section usable by a user to perform module image moving operation for moving, on the display, the image of a desired one of the modules, graphically displayed on the display, from an image area of the equipment implementing the module to an image area of another one of the equipments; a movement processing section that, in response to the module image moving operation by the user via the operation section, causes the remote control section to activate a new control module for remote-controlling a new module of a moved-to equipment, to which the image is to be moved, equivalent to the module of a moved-from equipment, causes settings and logical connection condition of the new control module to agree with the settings and logical connection condition of the control module of the module of the move-from equipment, and deactivates the control module of the module of the move-from equipment; and a display update control section that, when a series of operations of the movement processing section responsive to the module image moving operation has been performed successfully, updates a graphic display on the display into a display having the movement reflected therein.

In the present invention arranged in the aforementioned manner, images indicative of the modules implemented by the individual equipments in the music system and images indicative of the logical connection conditions between the modules are graphically displayed on the display of the control apparatus, and the user can perform operation of shifting or moving, on the display, a desired one of the graphically-displayed images from the image area of the equipment implementing that module to the image area of another one of the equipments. In response to the module image moving operation by the user, the remote control section deactivates the control module of the move-from equipment, i.e. the equipment from which the image is to be moved, activates a new control module of the moved-to equipment, i.e. the equipment to which the image is to be moved, and makes settings and logical connection of the new control module. In accordance with such operations, the graphic display on the display is updated into a display having the image movement reflected therein.

Further, the control apparatus is capable of implementing a module formed by software to perform a predetermined function, and the display control section is capable of causing the display to graphically display images indicative of the modules implemented by the individual equipments and the control apparatus in the music system and images indicative of the logical connections between the modules. In response to operation, by the user, of the operation section, the image of a desired one of the modules, graphically displayed on the display, can be moved, on the display, from the image area of the equipment implementing the module to an image area of the control apparatus, or from the image area of the equipment implementing the module to an image area of a desired one of the equipments.

With such arrangements, in a music system comprising a plurality of equipments connected via a network and a control apparatus (node), a module having been implemented, for example, by a DSP engine (node) can be shifted or moved to the control apparatus with current settings and logical connection condition of the module still maintained. Thus, the present invention can greatly facilitate user's operation for implementing the module using resources of the control apparatus. Therefore, the present invention can afford the superior benefit that setting, by the control apparatus, of respective operation and logical connections of the equipments can be set and changed with an increase ease.

According to still another aspect of the present invention, there is provided an improved music system comprising a plurality of equipments connected together via a network and a control apparatus that remote-controls a logical connection of each of the plurality of equipments via the network. In the music system, each of the equipments comprises: an execution section that executes a module formed by software to perform a predetermined function; and a connection section that, using the network, logically connects an input/output of the module with an input/output of another one of the equipments. Further, in the music system, the control apparatus comprises: a display; a display control section that causes the display to graphically display images indicative of the modules implemented by the equipments in the music system and images indicative of logical connection conditions between the modules; an operation section usable by a user to perform module image moving operation for moving, on the display, the image of a desired one of the modules, graphically displayed on the display, from an image area of the equipment implementing the module to an image area of another one of the equipments; a movement processing section that, in response to module image moving operation by the user via the operation section and by remote control via the network, causes the execution section of a moved-to equipment, to which the image is to be moved, to activate a new module equivalent to the module of a moved-from equipment, causes settings and logical connection condition of the new module of the moved-to equipment to agree with the settings and logical connection condition of the module of the move-from equipment, and causes the execution section to deactivate the module of the move-from equipment; and a display update control section that, when a series of operations of the movement processing section responsive to the module image moving operation has been performed successfully, updates a graphic display on the display into a display having the movement reflected therein.

In response to the module image moving operation by the user and through remote control via the network, the execution section of the moved-to equipment activates a new module equivalent to the module of the moved-from equipment, settings and logical connection condition of the new module of the moved-to equipment are caused to agree with the settings and logical connection condition of the module of the move-from equipment, and the execution section of the moved-from equipment deactivates the module of the move-from equipment. Thus, the settings and logical connection condition of the module of the move-from equipment can be transferred and set in the software module of the moved-to equipment, so that movement of any desired module within the network can be carried out with utmost ease through the image moving operation by the user.

According to still another aspect of the present invention, there is provided an improved music system comprising a plurality of equipments connected together via a network and a control apparatus that remote-controls respective settings of the plurality of equipments via the network. In the music system, the control apparatus comprises: working memories provided in corresponding relation to a plurality of equipments that should reside in the music system and storing respective settings of the equipments; an allocation section that allocates the respective settings of the plurality of equipments, stored in the working memories, to the corresponding equipments in the music system, wherein, when the settings of a particular equipment could not be allocated to any one of the equipments in the music system, the allocation section makes a search, through the music system, for any equipment capable of substituting for the particular equipment and allocates, as substitutional allocation, the settings of the particular equipment to the equipment, capable of substituting for the particular equipment, searched out from the music system; a synchronization instruction section that generates a synchronization instruction for collectively synchronizing a plurality of equipments; and a synchronization processing section that, in response to the synchronization instruction, causes the respective settings of the plurality of equipments in the music system to agree with the respective settings of the equipments stored in the working memories to thereby perform a synchronization process for allowing the settings of the equipments stored in the working memories and the settings of the equipments in the music system to agree with each other between corresponding equipments, wherein the synchronization is performed so as to cause the settings of the equipment capable of substituting for the particular equipment, allocated as a substitute for the particular equipment, to agree with the settings of the particular equipment.

In the present invention arranged in the aforementioned manner, the control apparatus stores, in the corresponding working memories, settings of a plurality of equipments that should reside in the music system, and the allocation section allocates the respective settings of the plurality of equipments, stored in the working memories, to the corresponding equipments in the music system. When the settings of a particular equipment could not be allocated to any one of the equipments in the music system, the allocation section makes a search, through the music system, for any equipment capable of substituting for the particular equipment and allocates, as alternative or substitutional allocation, the settings of the particular equipment to the equipment, capable of substituting for the particular equipment, searched out from the music system. When the synchronization process is to be performed, in response to the synchronization instruction, for allowing the respective settings of the equipments in the music system to agree with the settings of the equipments stored in the working memories, the synchronization is carried out such that the settings of the equipment capable of substituting for the particular equipment, allocated as a substitute for the particular equipment, to agree with the settings of the particular equipment stored in the working memory. Thus, where a combination of a plurality of desired equipments is to be collectively subjected to a synchronization process under control of the control apparatus, the present invention can achieve an extremely-enhanced usability of the system.

In the present invention, the "settings" of each of the equipments, stored in the working memory corresponding to the equipment, include a data set for setting an operational condition of the equipment and a data set for setting a logical connection between the equipment and another one of the equipments, and, the synchronization processing section can perform the synchronization on each of the equipments in terms of not only the operational condition and but also the logical connection with another one of the equipments. Thus, even where any particular one of the equipments to be synchronized is not connected to the network, another equipment can substitute for the particular equipment, so that the operational conditions and logical connection conditions, set for the individual equipments and the operational conditions and logical connection conditions of the actual equipments can be controlled in a collective manner. Therefore, in a music system comprising a plurality of equipments (nodes) connected via a network, the present invention can afford the superior benefit that operation and logical connections of the plurality of equipments can be set or changed by the control apparatus with an increased ease.

According to still another aspect, there is provided an improved program for causing a computer to perform a procedure for setting operation and logical connection of each equipment in a music system comprising a plurality of the equipments connected together via a network, the equipments in the music system including equipments implementing hardware modules and equipments implementing software modules, and the program comprises: a procedure for causing a display to graphically display logical connection conditions between the modules in the music system; a procedure for causing a user to perform input operation for selecting a desired module from among the modules displayed on the display and causing the user to perform input operation for setting a logical connection between the selected module and another one of the modules; and a procedure of causing the user to perform input operation for selecting a desired module from among the displayed modules so as to present, on the display, a screen for setting operation of the selected module and causing the user to perform input operation for setting operation of the selected module via the screen.

With such a program, respective logical connection conditions of all of the equipments in the network are graphically displayed on a screen to the user, irrespective of whether the equipments implement hardware modules or software modules. Via the display screen, the user can perform various input operation, such as operation for selecting a desired module and for setting, changing and deleting a logical connection of the selected module. Further, a screen can also be displayed to allow the user to perform operation, such as for setting, changing and deleting an operational connection of a selected module. Then, in accordance with the logical connection condition or operational connection set via the screen, a logical connection condition or operational condition of the equipment corresponding to the module can be actually set. Thus, the present invention permits setting of logical connections and operational conditions of all of networked equipments in a music system, and thus, the user can set respective logical connections and operational conditions of the networked equipments with an increased ease.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

Figure 8:
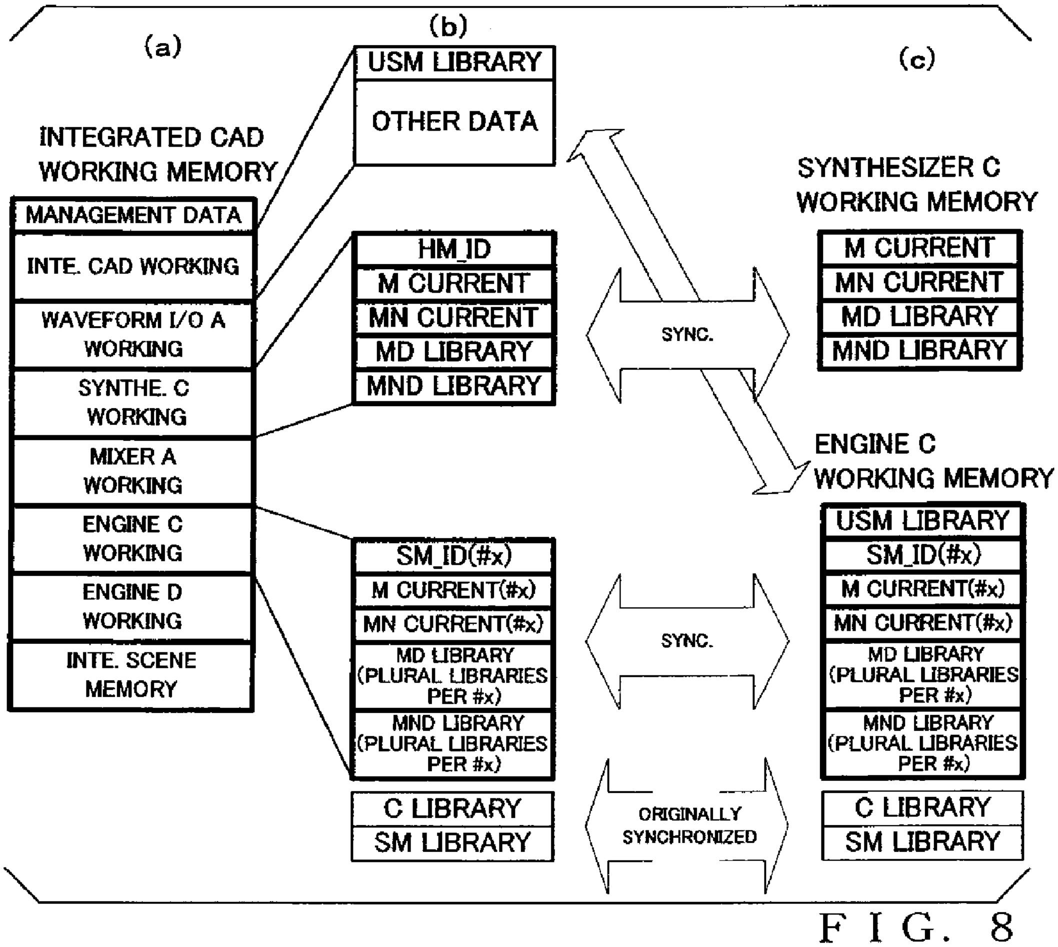
Figure 9:
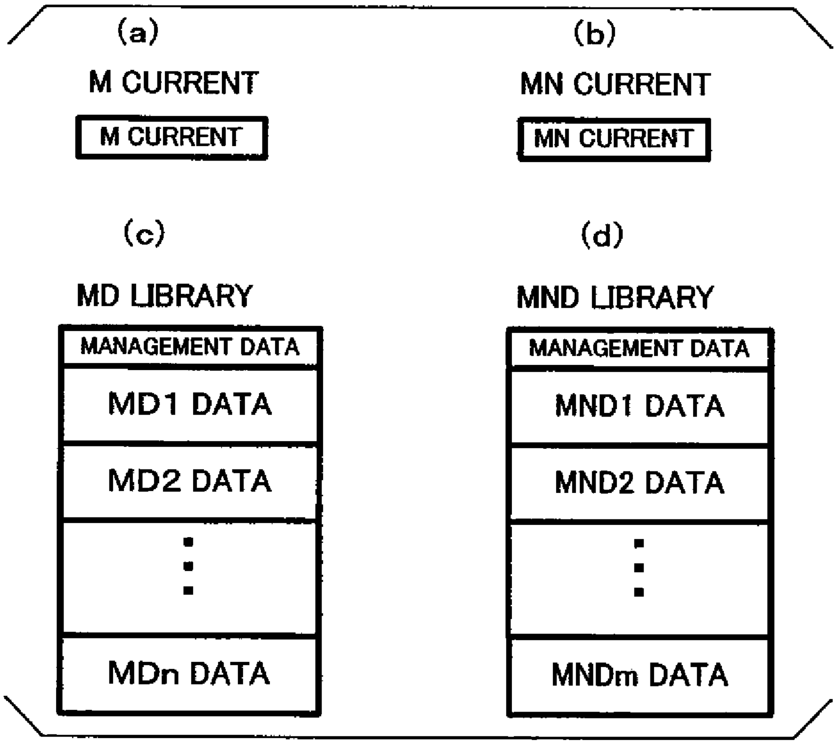
Figure 10:
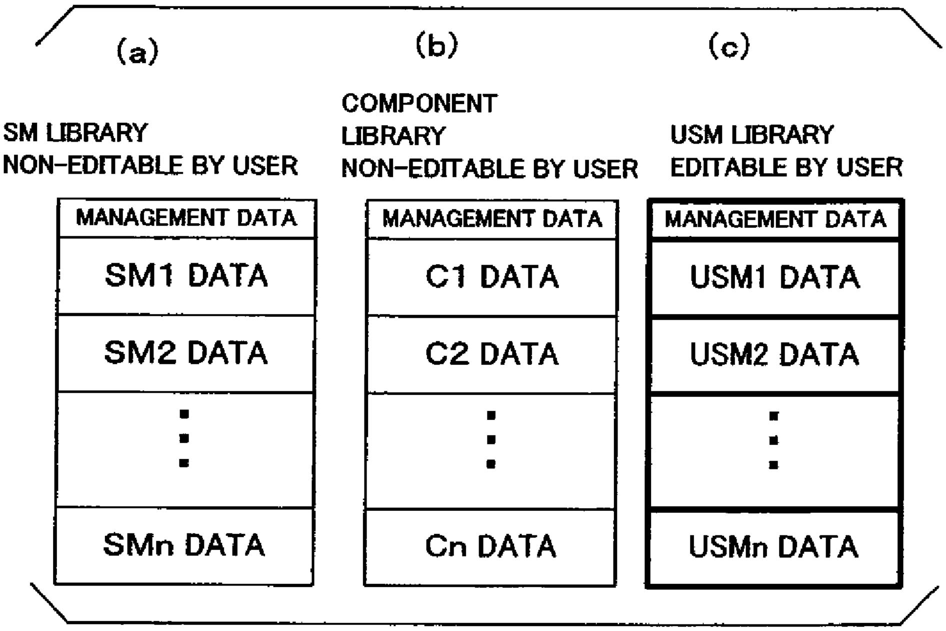
Figure 11:
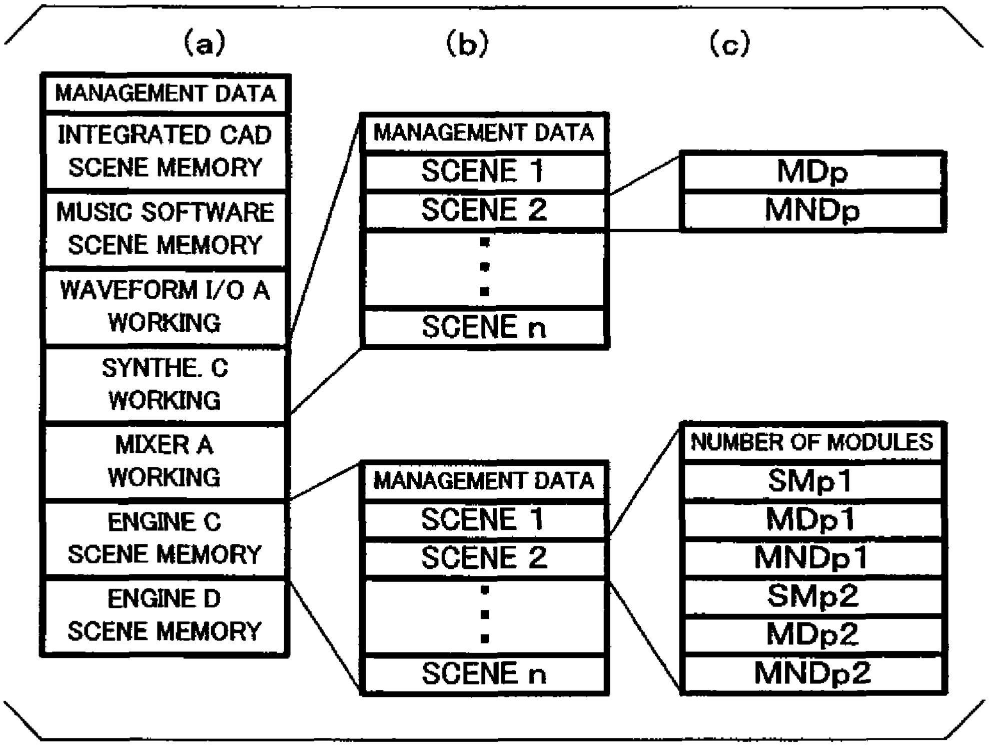
Figure 12A:
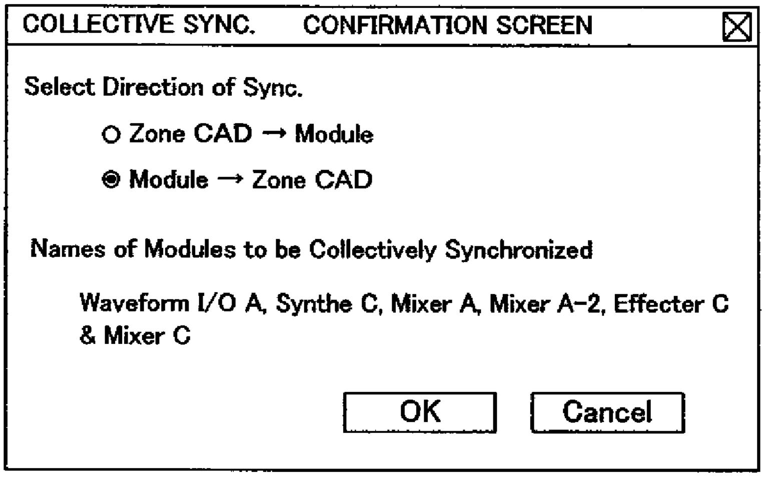
Figure 12B:
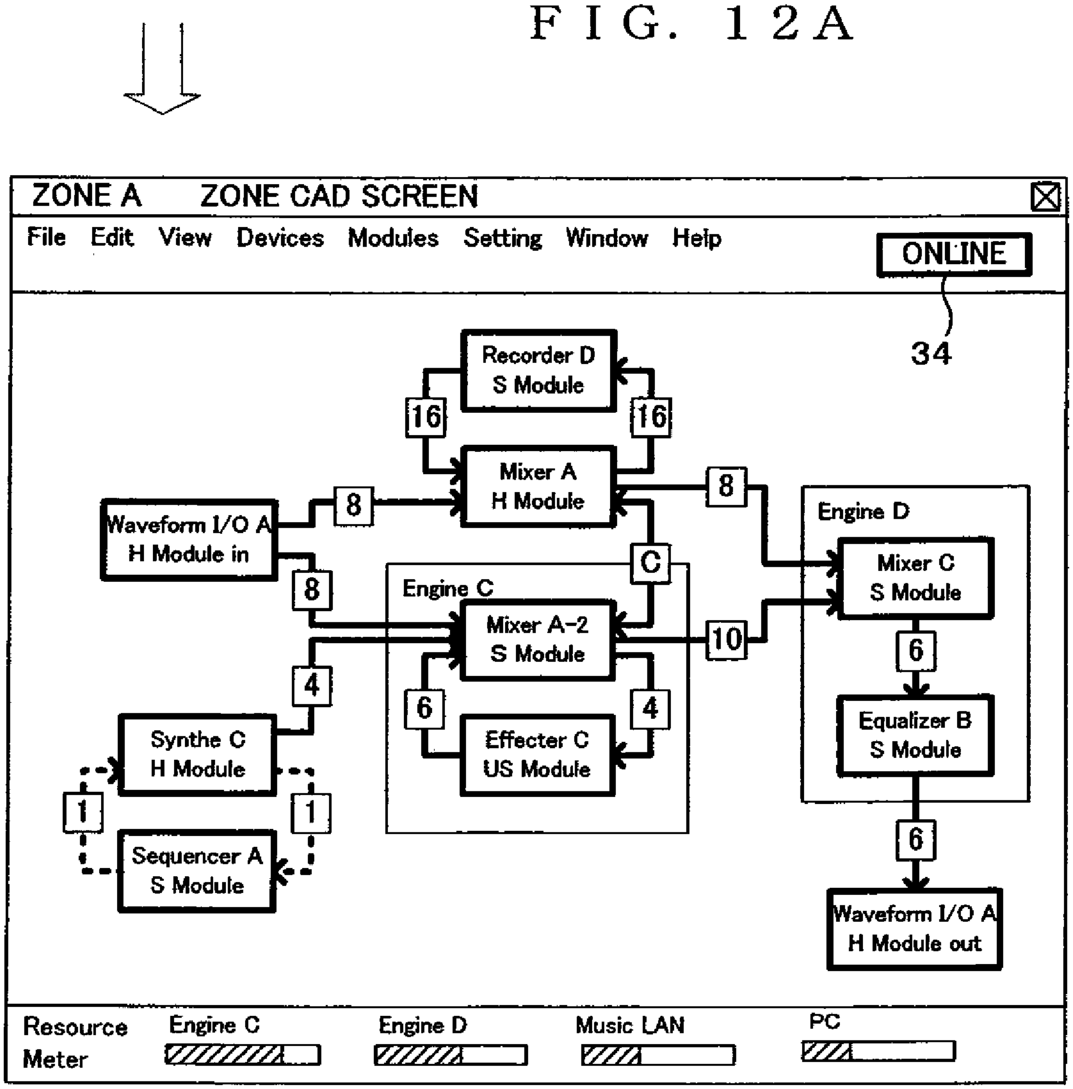
Figure 13:
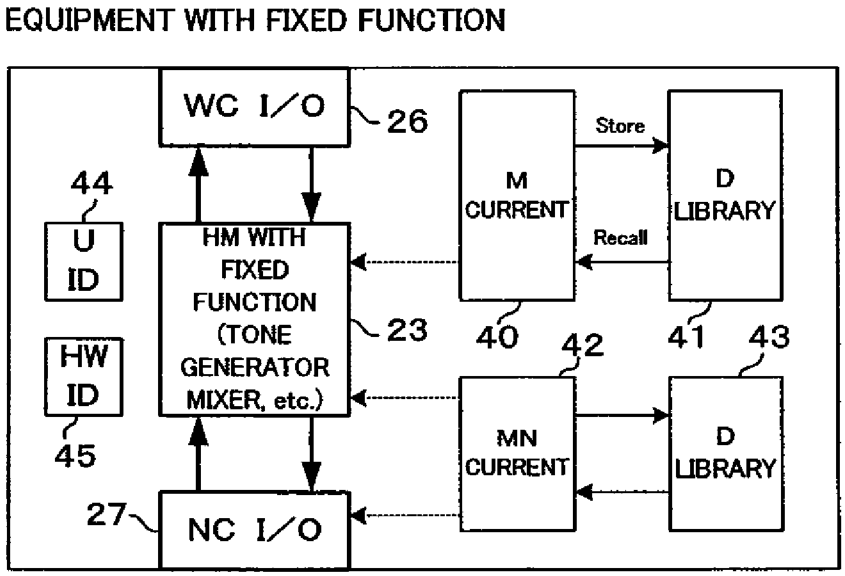
Figure 14:
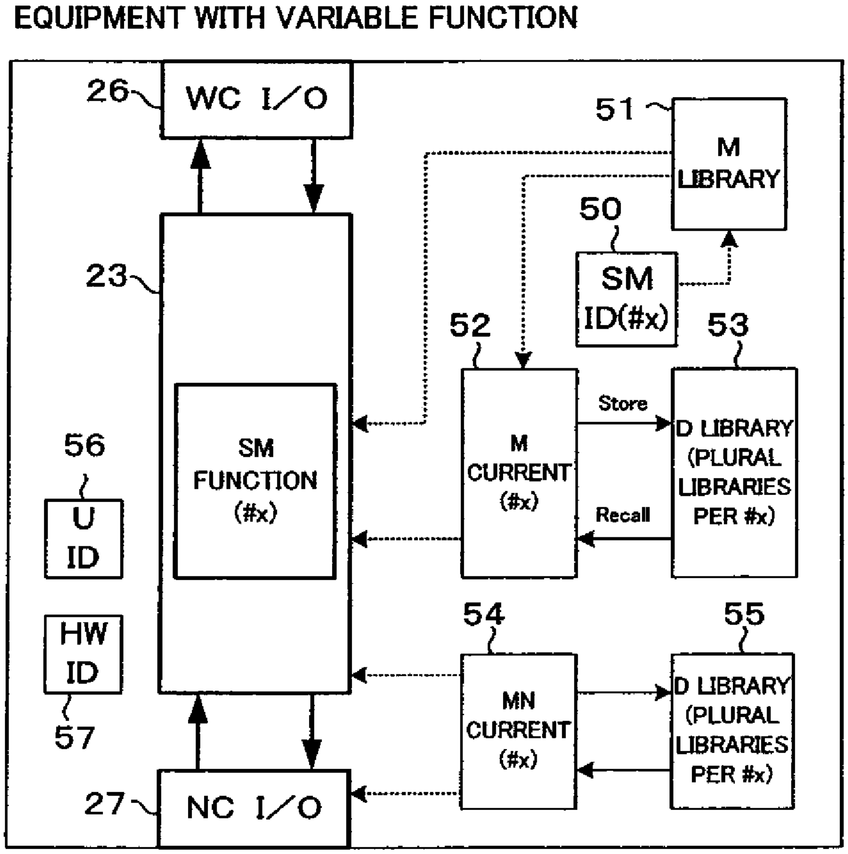
Figure 15:
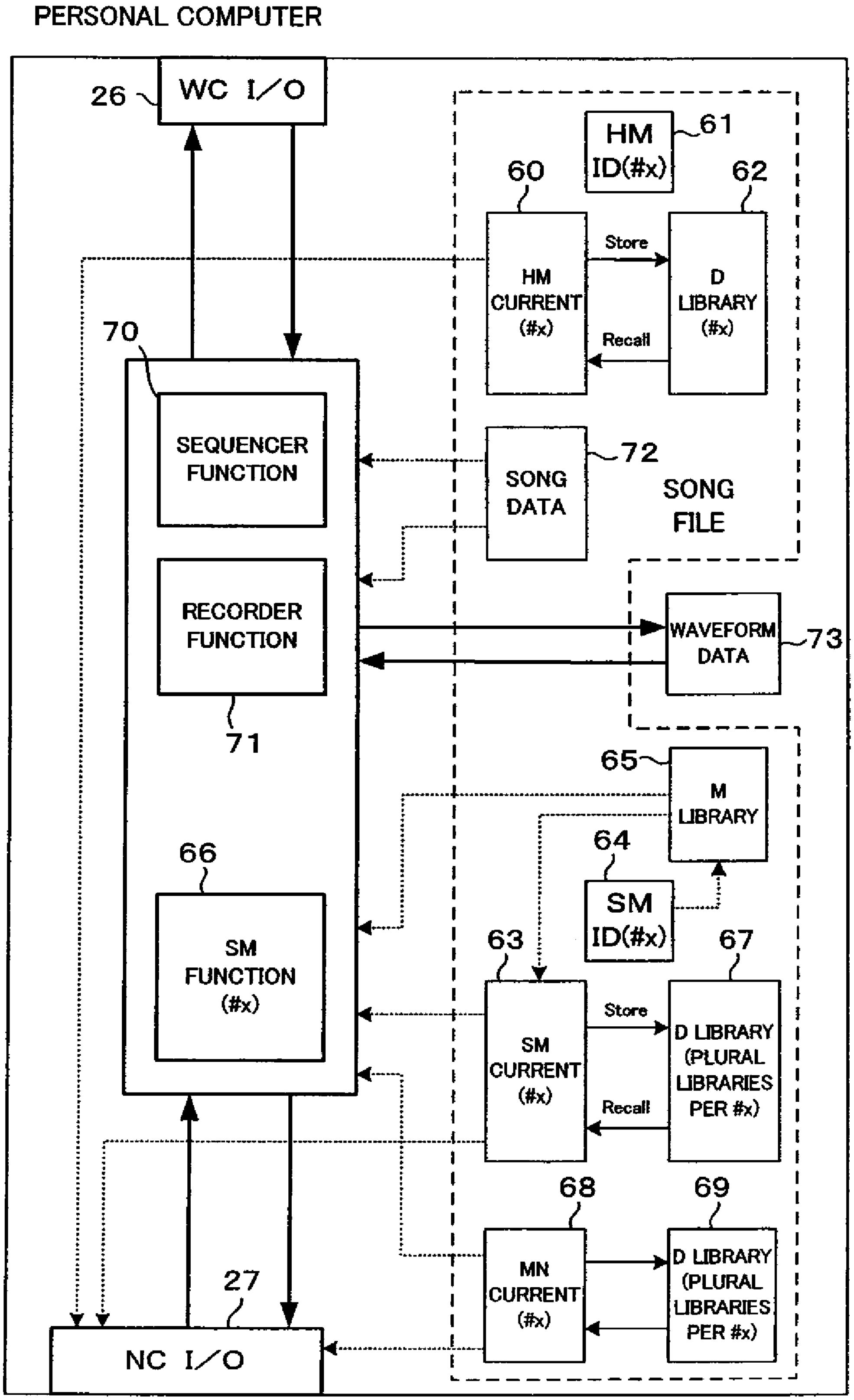
Figure 16A:
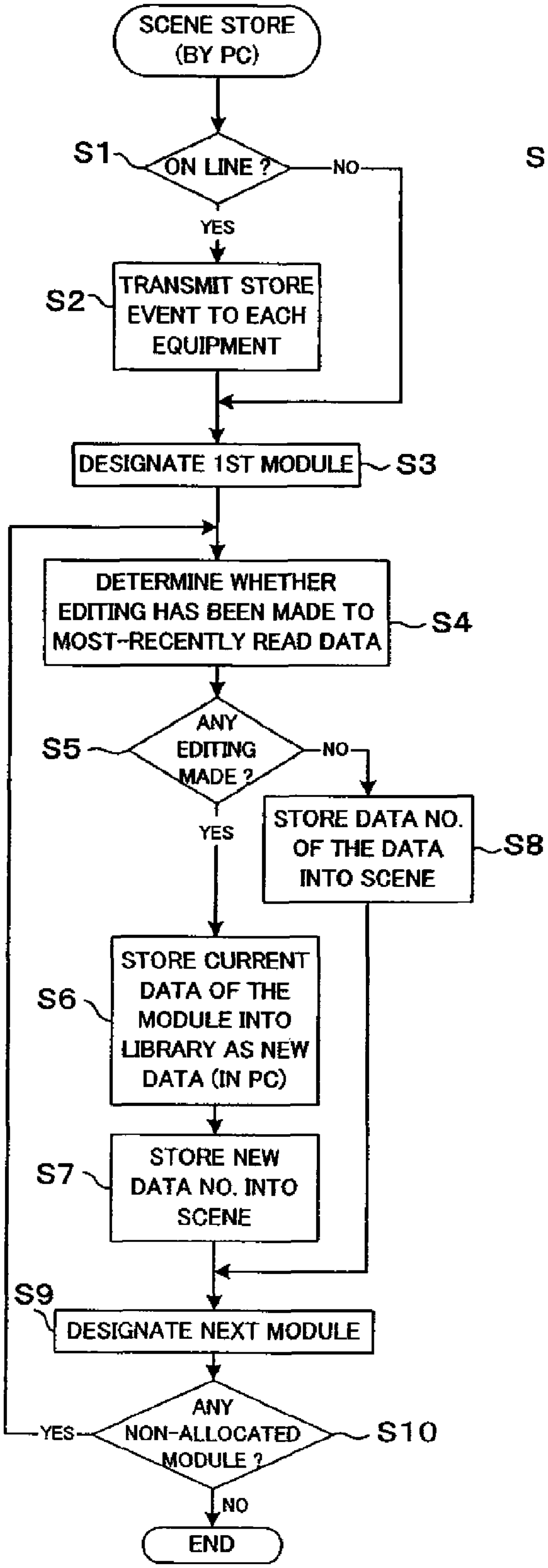
Figure 16B:
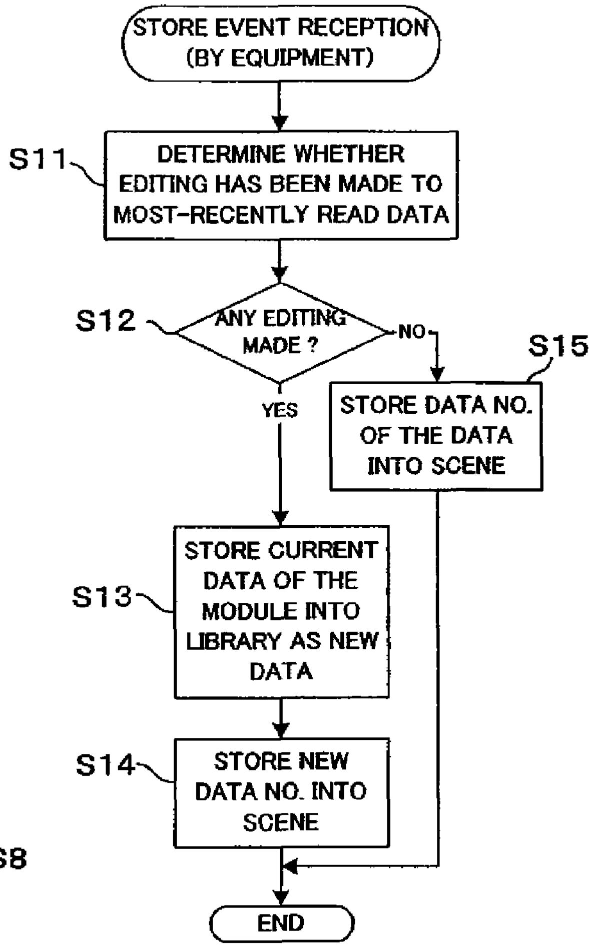
Figure 17A:
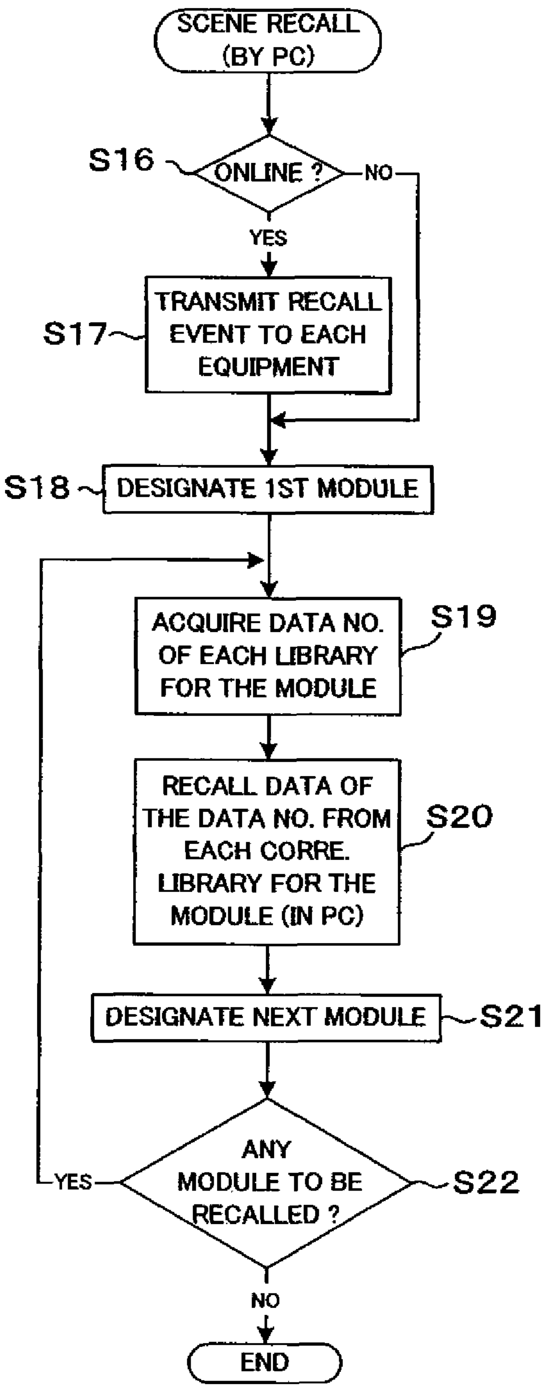
Figure 17B:
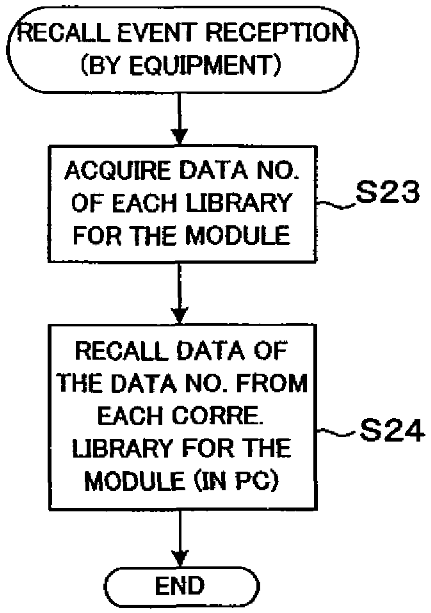
Figure 18:
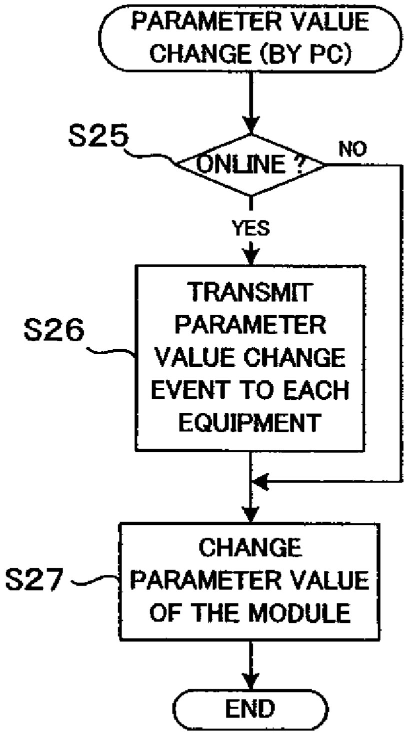
Figure 19A:
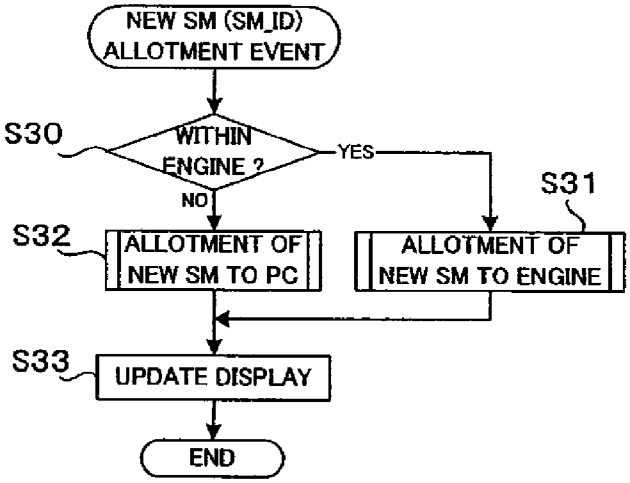
Figure 19B:
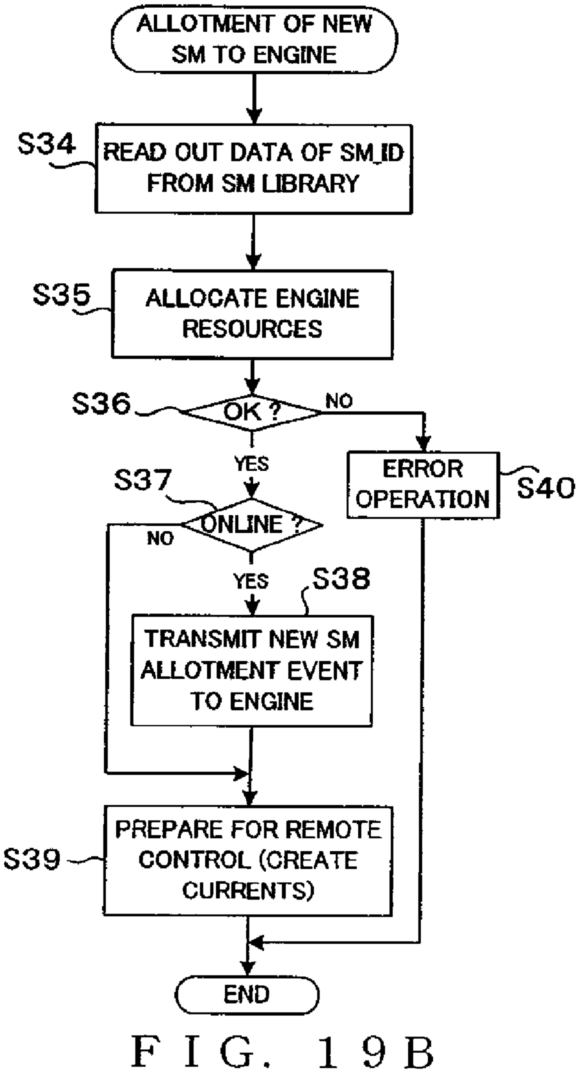
Figure 19C:
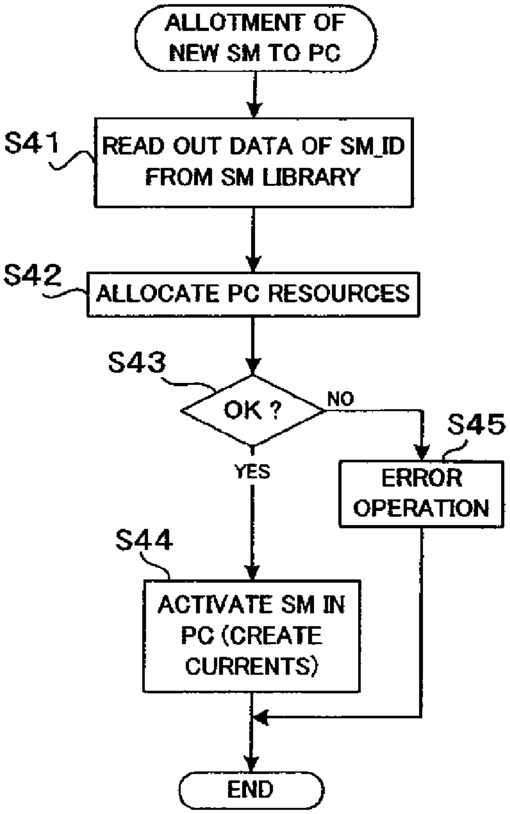
Figure 20A:
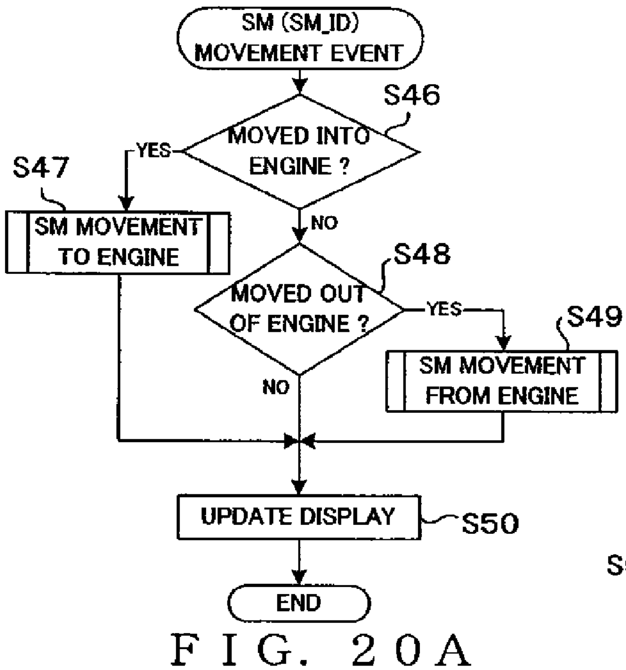
Figure 20B:
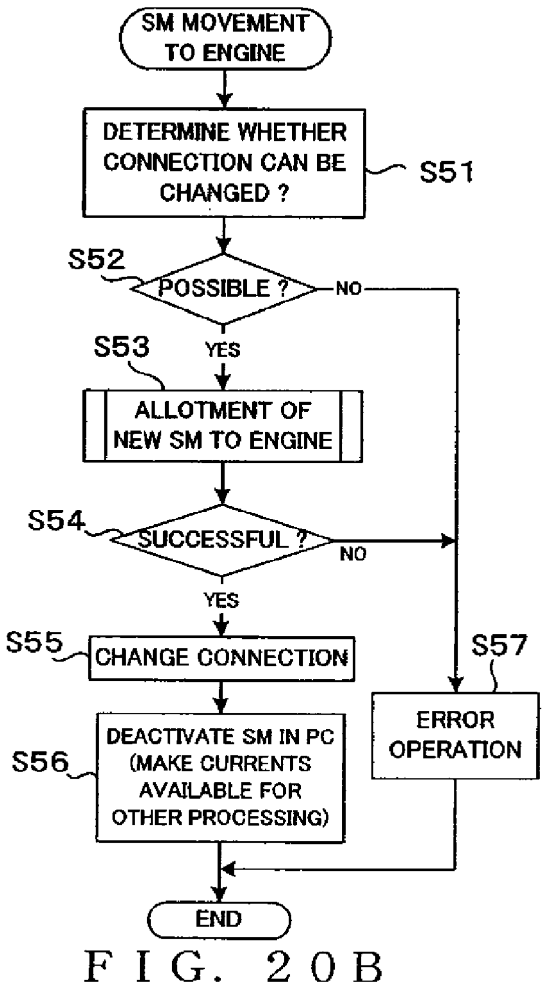
Figure 20C:
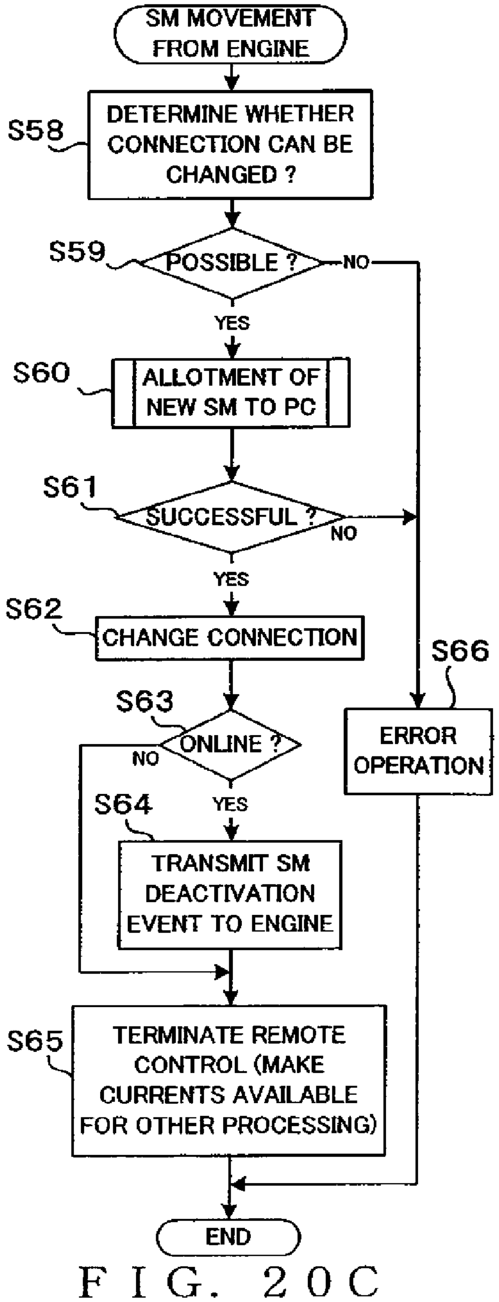
Figure 21:
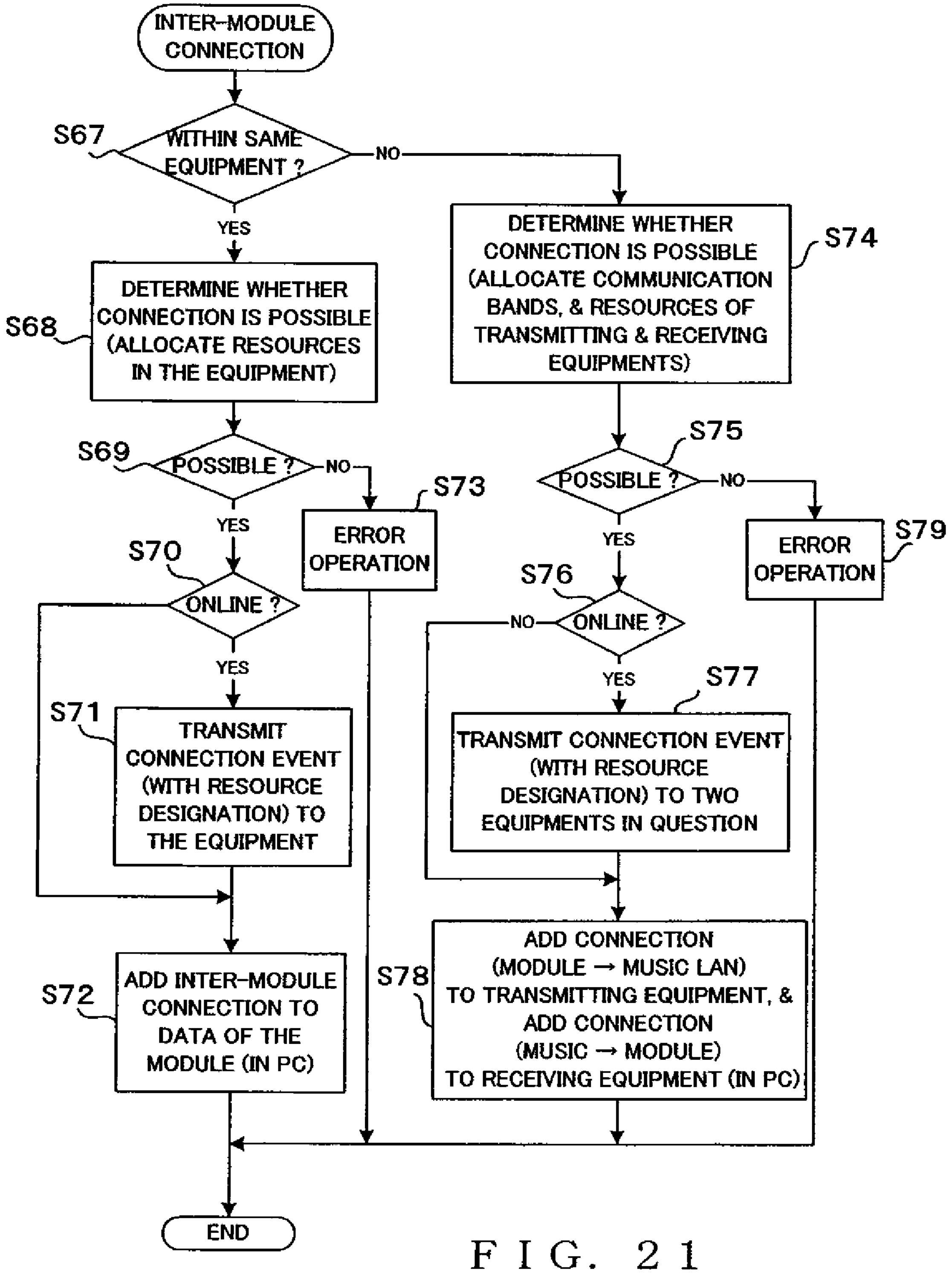
Figure 22A:
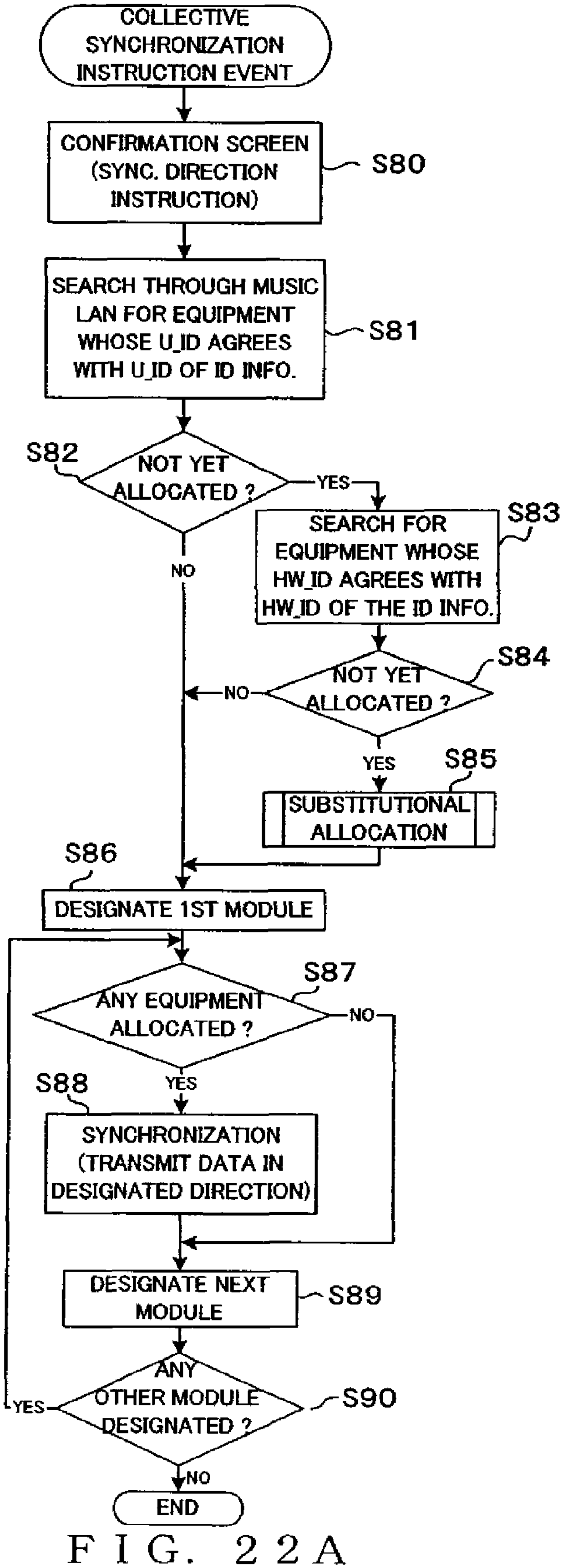
Figure 22B:
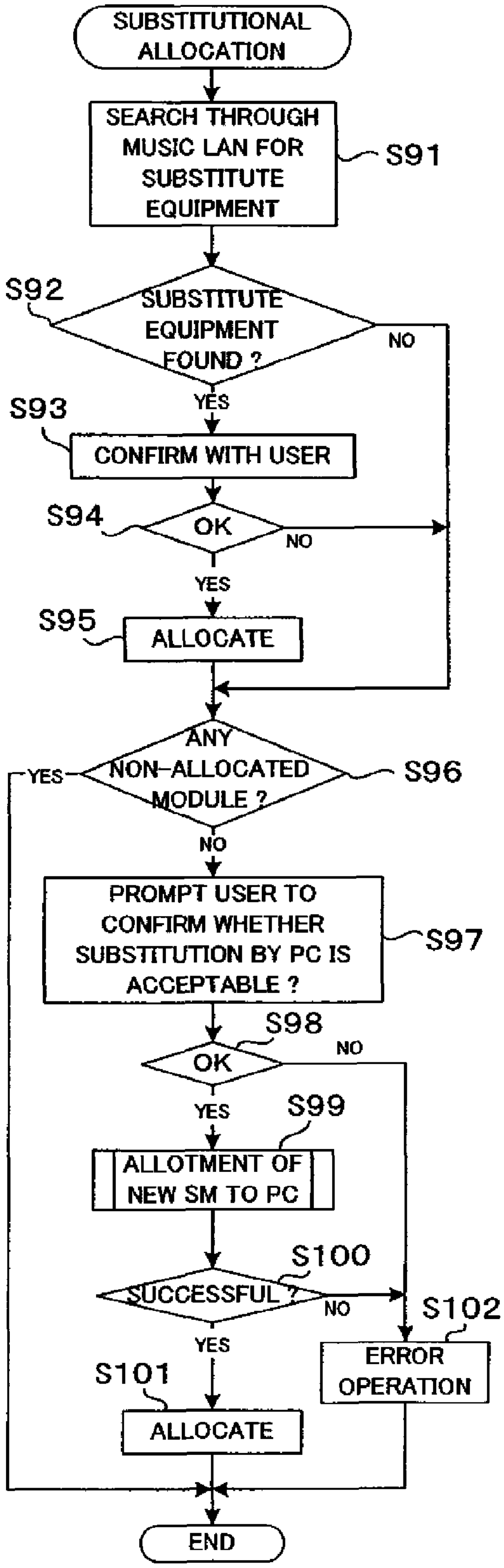

(a) and (b) of FIG. 8 are a diagram showing an example structure of an integrated CA working memory, and (c) of FIG. 8 is a diagram showing an example construction of a working memory in each music equipment;

FIG. 9 is a diagram showing examples of structures of an “M current”, “MN current”, “MD library” and “MND library” of FIG. 8;

FIG. 10 is a diagram showing examples of structures of an “SM library”, “C library” and “USM library” of FIG. 8;

FIG. 11 is a diagram showing an example structure of an integrated scene memory of FIG. 8;

FIG. 12A is a diagram showing an example of a confirmation screen displayed when a collective synchronization process is to be performed, and FIG. 12B is a diagram showing an example of the integrated CAD screen after the collective synchronization process has been performed;

FIG. 13 is a block diagram outlining control performed in each of music equipments (fixed in function) according to the embodiment;

FIG. 14 is a block diagram outlining control performed in each of music equipments (variable in function) according to the embodiment;

FIG. 15 is a block diagram outlining control performed in a PC according to the embodiment;

FIGS. 16A and 16B are flow charts showing an example of a scene store process according to the embodiment;

FIGS. 17A and 17B are flow charts showing an example of a scene recall process according to the embodiment;

FIG. 18 is a flow chart showing an example of a parameter value change process performed in each module according to the embodiment;

FIGS. 19A-19C are flow charts showing an example of processing for allotting a new software module to the integrated CAD screen;

FIGS. 20A-20C are flow charts showing an example of a software module movement process on the integrated CAD screen;

FIG. 21 is a flow chart showing an example of a connection process in response to inter-module logical connection operation on the integrated CAD screen; and FIG. 22A is a flow chart of a collective synchronization process according to the embodiment, and FIG. 22B is a flow chart of a substitutional allocation process performed in the integrated CAD screen.

DETAILED DESCRIPTION OF THE INVENTION

Figure 1:
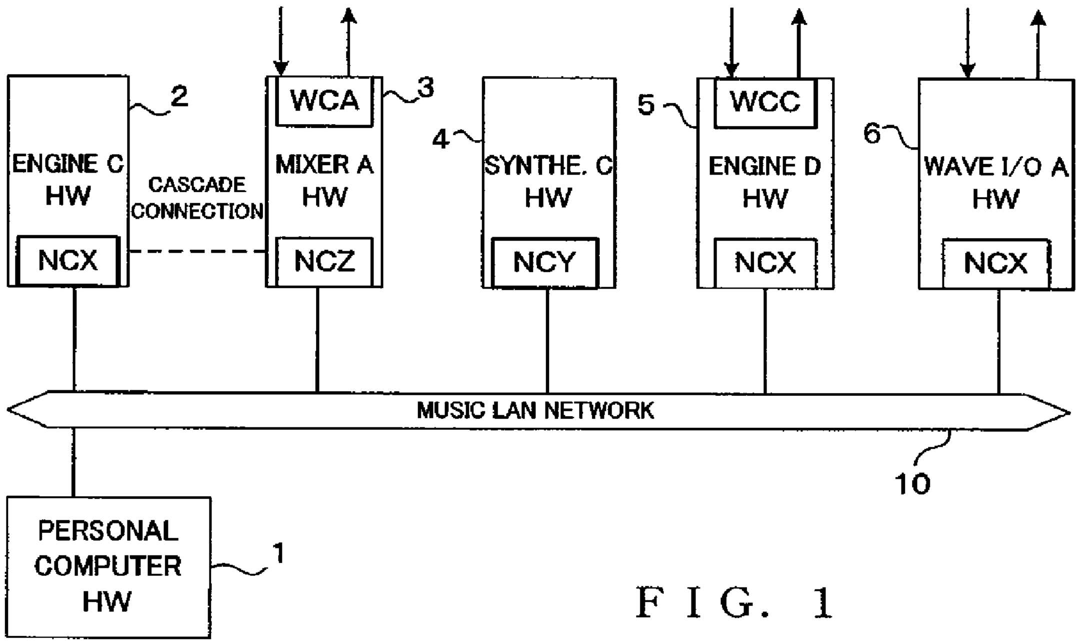
FIG. 1 is a block diagram schematically showing an example setup of a music system to which is applicable operation- and connection-setting integrated CAD software in accordance with an embodiment of the present invention.

FIG. 1 is a block diagram schematically showing an example setup of a music system to which is applicable operation-and-connection-setting integrated CAD software in accordance with an embodiment of the present invention. This music system comprises a plurality of nodes (e.g., music equipments related to music performance, reproduction, control, etc.) 2-6 connected together through a network (music LAN) 10 that is based on a predetermined communications standard (which may be any desired standard, such as a digital data transfer protocol proposed by the assignee of the instant application and called by its trademark “mLAN”)), USB, CobraNet (Ethernet), wireless LAN, or MADI). In the music LAN 10, buses for MIDI data and digital audio data are composed of a plurality of transmission lines based on a predetermined communications standard (e.g., IEEE1394), and MIDI data, digital audio data, control signals, etc. are transmitted in real time, from a desired node to another desired node, via the plurality of transmission lines. Note that, in executing the integrated CAD software, instructions, control data, etc. to be given to the individual nodes may be transmitted via the MIDI data bus.

In FIG. 1, a control apparatus 1 and various music equipments 2-6 are illustrated, as fundamental examples of nodes. The control apparatus 1 typically comprises a personal computer (hereinafter abbreviated as “PC”) having incorporated therein not only the embodiment of the integrated CAD software but also other software for implementing various music-related functions, to thereby execute programs pertaining to the various music-related functions. Further, the PC 1 has also installed therein remote controlling software for remote-controlling the music equipments 2-6 via the PC 1 (see Non-patent Literatures 1-3 identified above). Like the conventional counterparts, the remote controlling software employed here is constructed as a plug-in module to be plugged in other software and provided separately for each of the types of music equipments. The integrated CAD software is a program for managing operation and connection settings of the individual equipments in the music LAN 10, and, as will be later detailed, operational settings of various different types of equipments and logical connections between the equipments can be collectively managed and controlled by the integrated CAD software.

Let it be assumed that, in the instant embodiment, the PC 1 has installed therein music production software for implementing functions of a "sequencer" (MIDI data recording/reproducing function or automatic performance function) and a "recorder" (audio waveform recording/reproducing function) as the aforementioned music-related functions, the integrated CAD software is provided as plug-in software of such music production software, and each of the remote controlling software is provided as plug-in software of the integrated CAD software. Further, in addition to the aforementioned music-related functions, the PC 1 may have incorporated therein, as necessary, other processing modules of other music-related functions, such as a "synthesizer" (tone synthesizing function), "mixer" (audio waveform signal mixing function) and "effector" (audio effect impartment function).

As examples of the music equipments 2-6, various hardware devices are connected to the music LAN 10, such as engines 2 and 5, mixer 3 and synthesizer 4 that perform desired digital signal processing (digital audio signal processing) and a waveform I/O device 6 that inputs and outputs analog audio waveform data. In FIG. 1, suffix characters "C" and "D" added to the end of the engines 2 and 5, suffix character "A" added to the end of the "mixer", suffix character "C" added to the end of the "synthesizer" and suffix character "A" added to the end of the "waveform I/O" are expediential characters intended to distinguish among the various hardware equipments; however, these suffix characters may be interpreted as marks indicative of equipment types. As will be later described, the individual modules or hardware components are identifiable by their respective unique IDs. In this sense, the suffix characters are added just for convenience of explanation. Further, character groups NCA, NCY and NCZ are assigned to network connectors provided in the individual equipments 2-6 for connection to the music LAN 10. Further, characters X, Y and Z added to the characters "NC" (abbreviation of the network) indicate, for example, that the network connectors are of different types. Furthermore, character groups WCA and WCC are assigned to wave connectors provided in the mixer and processing engine 5 for inputting and outputting waveform data. Characters A and C added to the characters "WC" (abbreviation of the wave connector) indicate, for example, that the wave connectors are of different types.

In FIG. 1, alphabetical letters "HW" added to the PC 1 and individual nodes 2-6 each indicate that the corresponding equipment is constructed of hardware resources. Further, in FIG. 1, there is shown an example construction of the system construction in which the processing engine 2 and mixer 3 are physically interconnected via a cascade connection cable (i.e., cascade-connected with each other). The "cascade connection" is a type of connection between mixers which is intended to permit reciprocal exchange of audio signals and control signals between a plurality of mixers and thereby enhance an overall processing capability of the mixers (such as the number of mixing buses). Namely, the cascade connection is a physical connection via a dedicated cable, which is different from a logical connection between the nodes in the music LAN 10.

Figure 2:
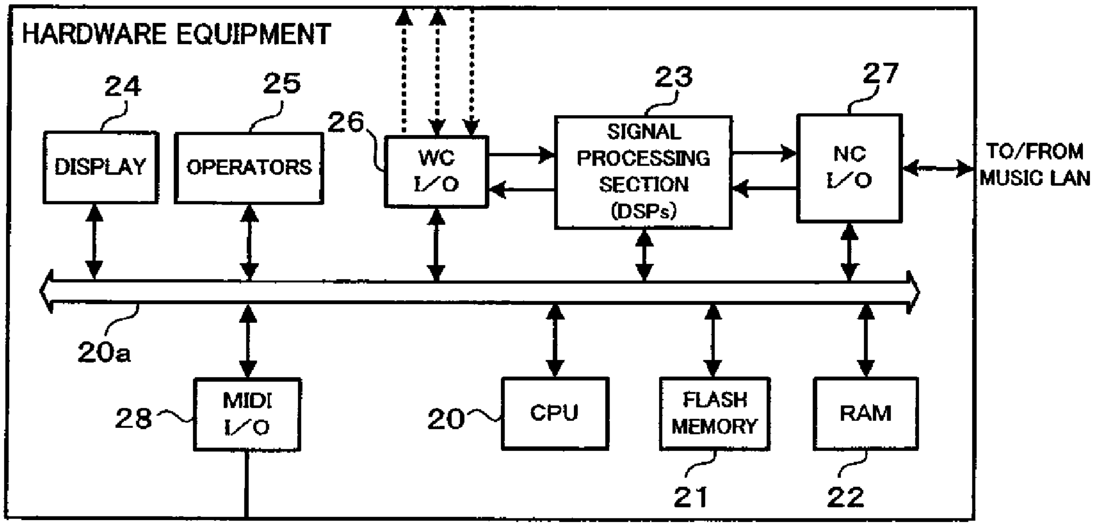
FIG. 2 is a block diagram showing an example hardware setup of each hardware (HW) equipment in the embodiment of the music system.

FIG. 2 is a block diagram outlining an example electric hardware setup of the music equipments (hardware (HW) equipments) 2-6. As will be later detailed, operations and functions implemented by the music equipments 2-6 differ from one equipment type to another. Because the music equipments 2-6 may be considered to be generally similar to one another in terms of the outline of the electric hardware setup, a typical form of construction, conceivable as the electric hardware setup of each of the music equipments 2-6, is representatively shown in FIG. 2 for conveniences of illustration and explanation. As shown in FIG. 2, each of the equipments 2-6 includes a CPU 20, a flash memory 21, a RAM 22, a signal processing section (a group of DSPs) 23, a display device 24, operators 25, a waveform interface (WC_I/O) 26, a network interface (NC_I/O) 27, and a MIDI interface (MIDI_I/O) 28 for communicating signals of the MIDI standard with external MIDI equipment. The above-mentioned components are connected together via a bus 20B.

The CPU 20 executes various programs stored in a memory, such as the flash memory 21 or RAM 22, to control operation or behavior of the entire equipment, control communication between the PC 1 and the equipment in question and perform other control. The flash memory 21 and RAM 22 are used as working memory areas as will be later described. The WC_I/O 26 is an interface for inputting and outputting analog or digital waveform data, and it includes an A/D converter and D/A converter for inputting and outputting analog data, and a digital interface for inputting and outputting digital data. The NC_I/O 27 is a network connector (music LAN interface) for connection to the music LAN 10. Via the NC_I/O 27, each of the equipments transmits various data, including waveform data, MIDI data, instructions, control data etc., to the music LAN 10, and takes in such various data required in the equipment.

The signal processing section 23 carries out signal processing, corresponding to musical functions to be performed by the equipment in question, on the basis of microprograms executed by the DSPs (hereinafter also referred to as "DSP-executed microprograms"). More specifically, the signal processing section 23 performs signal processing on MIDI data and audio data, supplied via the WC_I/O 26 or NC_I/O 27, on the basis of instructions given by the CPU 20 and then outputs signals, generated as a result of the signal processing, to outside the equipment in question via the WC_I/O 26 or NC_I/O 27. One or more DSP-executed microprograms to implement various music-related functions, such as the "mixer", "effector" and "equalizer", are removably incorporated in each of the processing engines 2 and 5, and each of the engines 2 and 5 implements a processing module for performing signal processing corresponding to any desired of the DSP programs incorporated therein. Further, in each of the equipments, such as the mixer 3, synthesizer 4 and waveform I/O device 6, where the music-related functions to be implemented are fixed per hardware device (i.e. per equipment type), the signal processing section 23 implements a processing module for signal processing corresponding to the equipment type.

Figure 3:
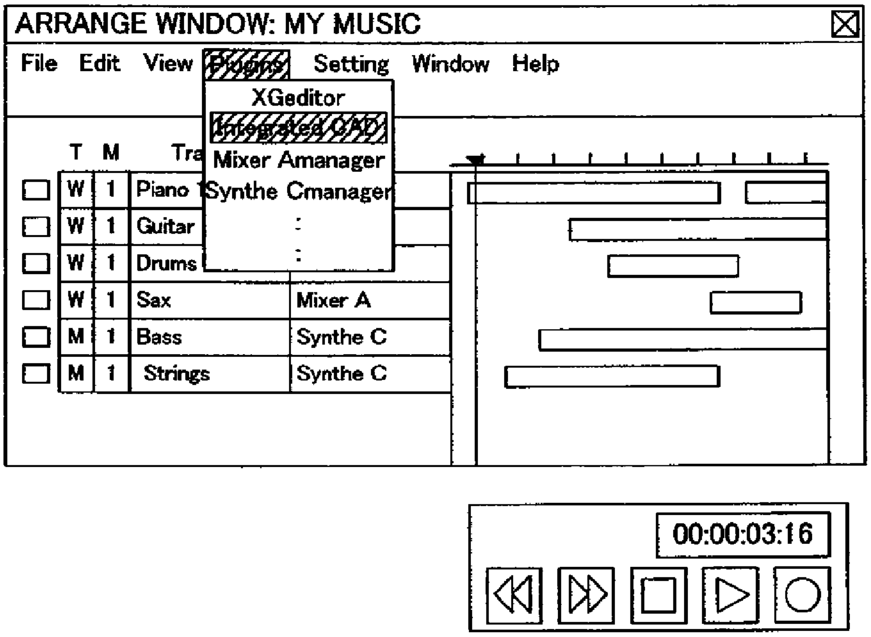
FIG. 3 is a diagram showing an example display screen displayed when a music production application software having the integrated CAD software plugged therein is executed by a control apparatus (PC)

As noted above, the integrated CAD software according to the instant embodiment is incorporated as plug-in software of the music software installed in the PC 1. FIG. 3 shows a given display screen (Arrange Window) displayed as the music software is executed. On the "Arrange Window", there are displayed an audio waveform track (recorder track), forming song data of a music piece currently worked on by the music software and a MIDI track (sequencer track).

Once a user left-clicks on a menu button "Plugins" with a mouse on the screen, a pop-up menu for selecting desired plug-in software plugged in the music software is displayed. Names of various plug-in software listed up in the pop-up menu include names of the integrated CAD software according to the instant embodiment, editing software for a tone generator module, remote controlling software for the music equipments 2-6. By the user mouse-clicking on the name of the "integrated CAD software", the integrated CAD is selected and activated. Needless to say, the present invention is not so limited; for example, the integrated CAD software may be incorporated in the PC 1 as independent application software so that the CAD software can be started up independently.

Figure 4:
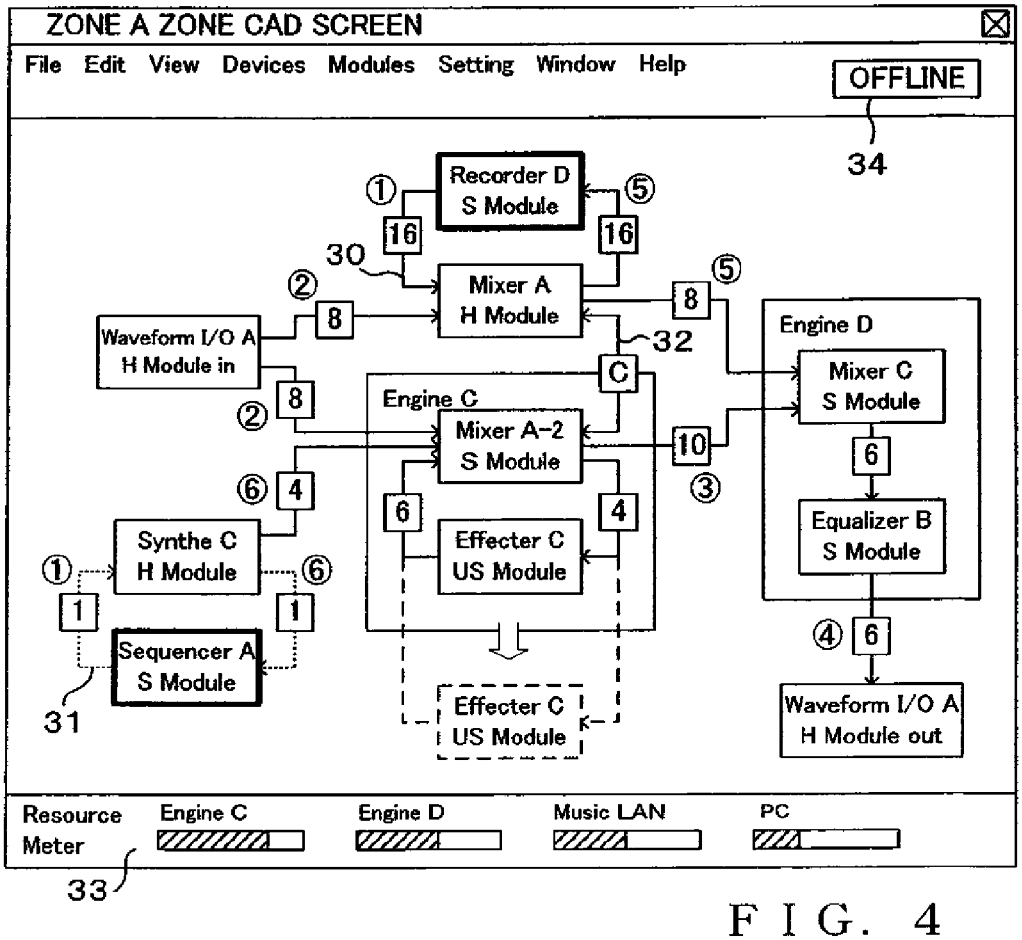
FIG. 4 is a diagram showing an integrated CAD screen that, in accordance with the integrated CAD software, graphically displays connection conditions of all modules in a network.

Once the integrated CAD software is started up on the PC 1, all of the processing modules, constituting a LAN in the network 10, and logical connection conditions between the processing modules are graphically displayed on the display device of the PC 1. FIG. 4 shows an example of the screen graphically displaying such connection conditions between all of the modules. In the figure, "Zone A" is a unique name assigned to a group of nodes belonging to the music LAN which the user sets, manages and uses. With the integrated CAD software of the invention, a plurality of music LANs can be managed separately from each other; each of such LANs is also called herein "zone". In order to activate a screen of a particular zone (group of nodes belonging to a LAN) as illustrated FIG. 4, arrangements are made to allow selection of a desired zone (group), as will be later detailed. Zone (group) information indicative of a selected zone when the program was terminated last time may be stored in memory so that a connection screen (integrated CAD screen) of the last-selected zone can be automatically activated as the integrated CAD software is started again. Data of the music software including data of the integrated CAD software, having been set here, can be stored, as a song file (to be later described) into a hard disk and/or the like at any given time in accordance with an instruction by the user, and the thus-stored song file (including data of the integrated CAD software) can be read into the music software being activated by the PC 1.

Now, an example of the integrated CAD screen is explained with reference FIG. 4. On the integrated CAD screen, there are displayed various GUI objects including icons (indicated in the figure in rectangular blocks for simplicity of illustration) that correspond to various hardware and software processing modules implemented by the individual nodes 1-6 connected to the music LAN 10 (see FIG. 1). To the icon of each of the processing modules, there are additionally displayed an appropriate visual representation that allows the user to readily identify music processing to be performed by the module (in the illustrated example, an alphabetical letter "A", "D" or "C" or the like is added, like "mixer A", "recorder D" or "engine C") and an appropriate visual representation that allows the user to readily identify whether the module is a hardware module or software module (in the illustrated example, an indication "H module" or "S module" is used); that is "S module" represents a software module while "H module" represents a hardware module. Further, in the figure, "US module" is also a software module, which is constructed freely by the user on a CAD editing screen (to be later described in relation to FIG. 7). Further, because the "engine" is a hardware module for executing a software module, a software module may be placed inside the icon of the "engine".

The H modules are each a processing module implemented as a fixed function of the hardware equipment; in FIG. 4, the mixer 3 ("mixer A_H module"), synthesizer 4 ("synthe C_H module") and waveform I/O device 6 ("waveform I/O·A_H module in" and "waveform I/O·A_H module out") are H modules. In the case of the waveform I/O device 6, an analog waveform input section and analog waveform output section are handled as separate H modules, i.e. as the "waveform I/O·A_H module in" and "waveform I/O·A_H module out", respectively.

The S modules are processing modules implemented by execution of software programs in the engines 2 and 5 (DSP-executed microprograms in the engine). In the illustrated example of FIG. 4, "mixer A-2_S module" and "effector C_US module" of the engine 2 ("engine C"), "mixer C_S module" and "equalizer B_US module" of the engine 5 ("engine D"), and "sequencer A_S module" and "recorder D_S module" implemented by the PC 1 are handled as S modules. The "recorder D_S module" is a module for implementing the function of the audio waveform track (recorder track) shown in FIG. 3, and the "sequencer A_S module" is a module for implementing the function of a MIDI track (sequencer track).

On the integrated CAD screen illustrated in FIG. 4, connection lines (audio transmission lines) 30 for transmitting audio waveform data in real time between the modules are each indicated by a solid line with an arrow head indicative of a transmission direction. Further, connection lines (MIDI transmission lines) 31 for transmitting MIDI data (tone generation instructing data) in real time between the modules are each indicated by a dotted line with an arrow head indicative of a transmission direction. Further, a numeral indicated within a small rectangular block on each of the transmission lines 30 and 31 indicates the number of channels of audio waveform data or MIDI data to be transmitted over the transmission line 30 or 31. Namely, via each of the transmission lines 30 or 31, audio waveform data or MIDI data of a plurality of channels can be transmitted. Although not shown in the illustrated example of the integrated CAD screen, all of the equipments managed by the integrated CAD software are connected via the control-data-transmitting MIDI transmission lines. For convenience of illustration, FIG. 4 representatively shows only a connection by the audio transmission line 30 from the recorder D_S module to the mixer A_H module, and only a connection by the MIDI transmission line 31 from the sequencer A_S module to the synthe C_H module. Further, for the "engine" hardware module, line connections are made for icons of software modules placed within the icon of the hardware module; no line connection is made for the icon of the "engine" as normally made on the conventional CAD screen for "engine".

Of the audio transmission lines 30 and transmission lines 31, line connections (logical connections) made via the music LAN 10 are indicated with encircled numerals (1-6 in the figure) added near the lines. In the instant embodiment, there is employed, as an example of a data transmission scheme in the music LAN 10, a scheme where audio waveform data or MIDI data are transmitted using a plurality of transmission channels, and the encircled numerals near the audio and MIDI transmission lines indicate transmission channel numbers in the music LAN 10.

Figure 5:
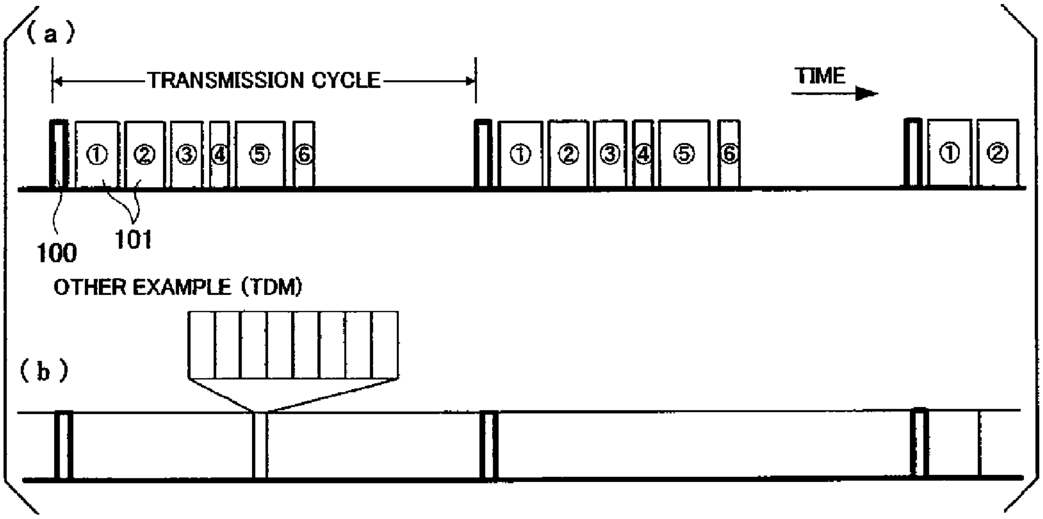
FIG. 5 is a data transmission timing chart outlining data transmission in a music LAN according to the embodiment.

FIG. 5 is a data transmission timing chart outlining the data transmission in the music LAN 10, which particularly shows an example timewise arrangement of data packets to be transmitted in the network compliant with the well-known IEEE1394 standard. Cycle data packets 100, defining the beginning of data transmission cycles, are delivered every predetermined period (e.g., 125 μs), and a plurality of isochronous packets 101 are allotted to each transmission cycle. The plurality of isochronous packets 101 are transmission channels to be used for transmission of data of which strict real-timeness is required, and encircled numerals "1"-"6" in the figure correspond to the transmission channels on the CAD screen of FIG. 4. In the music LAN 10, one transmission channel is allocated to each of the nodes 1-6 through logical connection and settings are made as to which data-receiving nodes should receive which signals of which transmission channels, through inter-node logical connections. Information for setting a logical connection between transmitting and receiving nodes and other data of which no strict real-timeness is required are transmitted, through asynchronous transmission, during an empty time in the transmission cycle following transmission of the isochronous packets 101. The data transmission scheme in the music LAN 10 is not limited to the one illustrated in FIG. 5 and may be any one of the conventionally-known schemes, such as a time-divisional multiplex (TDM) scheme illustrated in (b) of FIG. 5 as another example of the data transmission scheme, i.e. a scheme in accordance with which code strings of individual signals are time-divided and multiplexed with their respective transmission-channel-occupying times displaced from one another. In such a case, for data transmission of which real-timeness is required, a time slot may be designated by a transmission channel number so that the data are transmitted using the designated time slot. For data transmission of which no real-timeness is required, on the other hand, the data may be transmitted using a time slot secured in advance for asynchronous transmission, or by automatically assigning a time slot, currently not in use for real-time transmission, to the data transmission.

Some examples of the connections are explained below. According to one of the examples, logical connections are made such that audio waveform signals of eight channels are input, from the waveform inputting "waveform I/O·A_H module in" (waveform I/O device 6 of FIG. 1), to the "mixer A_H module" (mixer 3 of FIG. 1) via the transmission channel of channel No. 2, and that audio waveform signals of other eight channels are input, from the waveform inputting "waveform I/O·A_H module in", to the software "mixer A-2_S module" (software mixer implemented by the processing engine 2 of FIG. 1, i.e. "engine C") via the same transmission channel of channel No. 2.

Further, connection settings are made such that MIDI data are communicated between the "synthesizer C" (synthesizer 4 of FIG. 1) and the software module "sequencer A" in the PC 1 via a connection line of one channel. Further, the hardware "mixer A" implemented by the mixer 3 and the software mixer A-2 implemented by the processing engine 2 are cascade-connected with each other. On the CAD screen, a character "C" is attached to the connection line 32 between the mixer A and the mixer A-2, to clearly indicate that the connection line 32 provides a cascade connection.

Further, in a lower end portion of the integrated CAD screen, resource meters 33 are displayed, which monitor current states of processing and use of the engine C, engine D, music LAN and PC and indicate, in real time, capacities of system resources being used by the individual devices to perform various processing. The resource meters of the "engine C" and "engine D" each indicate states of communication and arithmetic operation of the engine (how much percentage of the arithmetic capability of the engine has been used by the engine), the resource meter of the "music LAN" indicates a current state of use of the music LAN, i.e. which bands of the transmission cycle of FIG. 5 are now being used by the music LAN to perform data transmission, and the resource meter of the "PC" indicates how much percentage of the processing capability of the PC has been used (e.g., remaining capacity of the memory areas).

The user can edit the configuration or construction of the network 10 of the zone displayed on the integrated CAD screen. Examples of the network editing operation that can be performed by the user include, positioning (or placement), addition, deletion, etc. of an icon of a module, setting, change, etc. of a connection between modules (i.e., inter-module connection), and so on. Details of such editing operation and operational conditions for achieving the network editing operation that can be performed by the user will be discussed later.

Figure 6:
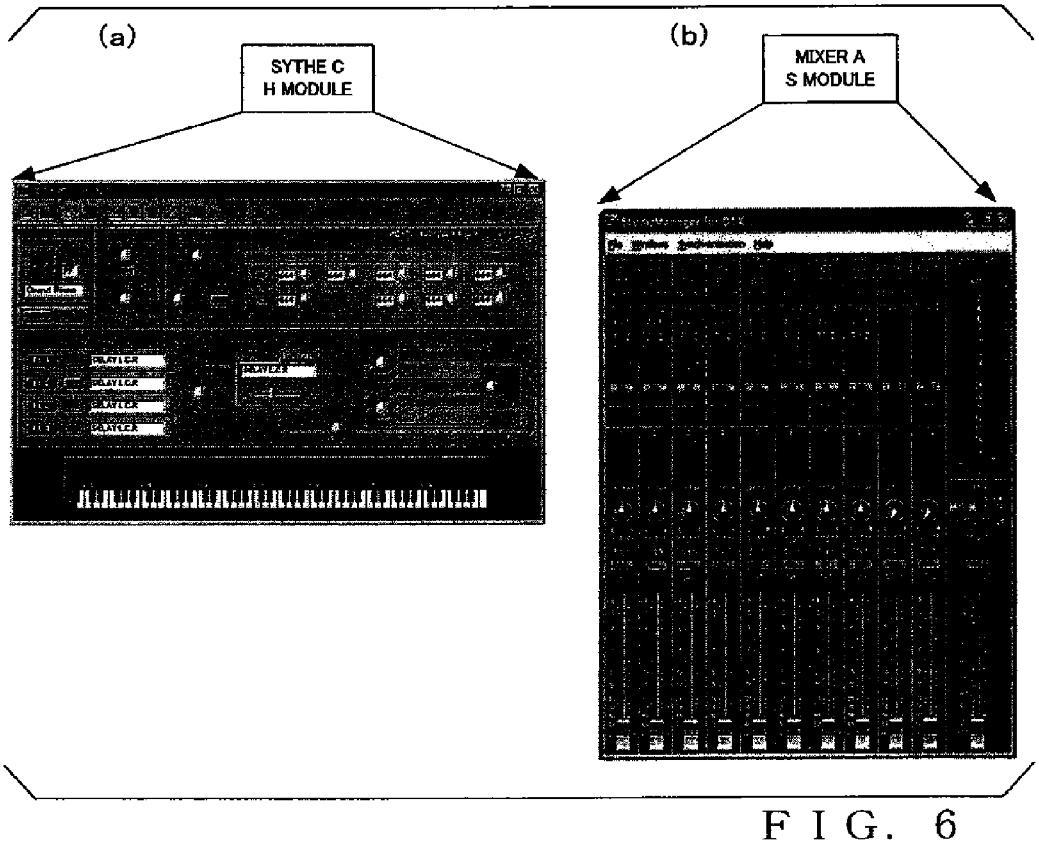
FIG. 6 is a diagram showing an example of an operation setting screen for setting operation of a module selected on the integrated CAD screen.

Further, by the user selecting the icon of a desired module through predetermined input operation (e.g., operation for pointing to and double-clicking, via a mouse, on the module icon), a screen for setting operational parameters of the selected module can be opened on the display of the PC 1. Namely, in response to user's selection operation, an instruction is output to the remote controlling software, corresponding to the selected module, such that the remote controlling software displays an operational parameter setting screen for the selected module. As examples of the operational parameter setting screen, the operational parameter setting screen for the "synthesizer C_H module" of FIG. 4 is shown in (a) of FIG. 6, and the operational parameter setting screen for the "mixer A-2_S module" of FIG. 4 is shown in (b) of FIG. 6. As illustrated in (a) or (b) of FIG. 6, an image simulative of an operation panel of an actual hardware equipment corresponding to the selected module is displayed, so that the user can use CAD images of operators and switches, displayed on the operation panel image, to perform operation for setting corresponding operational parameters. For the "mixer A_2" which a software module, an image simulative of an actual operation panel of the "mixer A" (hardware or H module) equivalent to the "mixer A_2" is displayed on the operational parameter setting screen. Operation or behavior of the PC 1 during the operational parameter setting will be described later.

Further, by the user designating the icon of a user software module (US module) implemented by the engine 2 or 5 through different input operation from the aforementioned (e.g., right-clicking on the icon), a pop-up menu for the user software module can be deployed. Thus, once the user selects "CAD Edit" from the menu, a "CAD editing screen" (see FIG. 7) is opened. Internal configuration currently set for the selected module is displayed in CAD graphic images on the CAD editing screen, so that the internal configuration can be edited via the screen.

Figure 7:
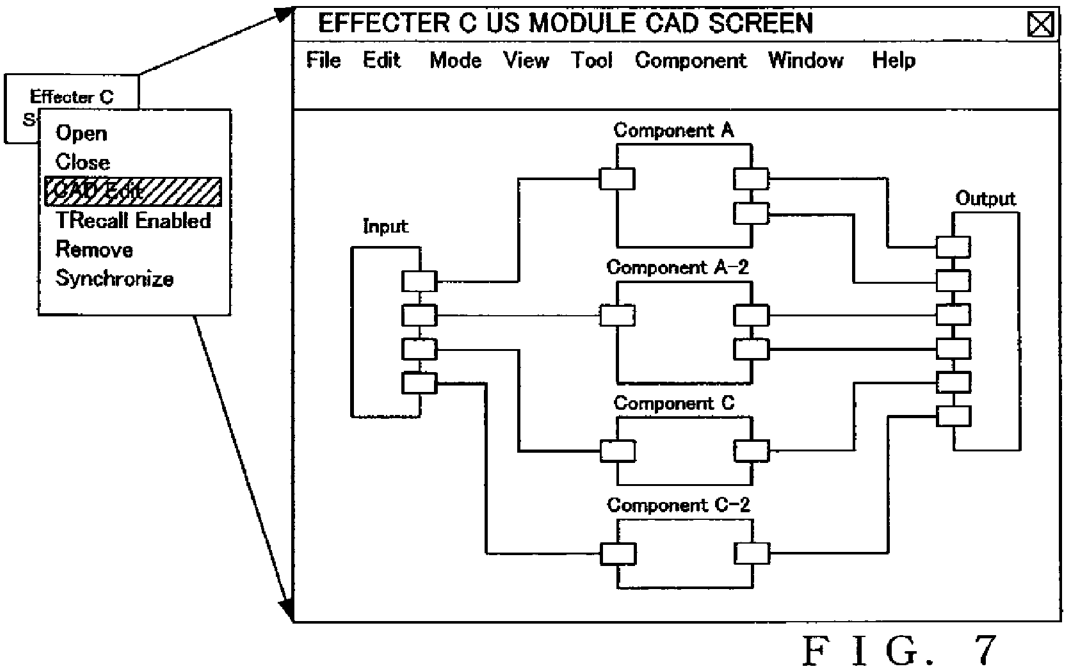
FIG. 7 is a diagram showing an example of a module CAD screen for performing CAD editing on a module selected via the integrated CAD.

FIG. 7 shows a US-module CAD editing screen for the effector C. In the illustrated example, the "effector C_US module" is composed of component A (e.g., compressor), component A-2 (e.g., another compressor), component C (e.g., equalizer) and component C-2 (e.g., another equalizer) arranged in parallel with one another and between input connectors ("Inputs") of four channels and output connectors ("Outputs") of six channels. On the CAD editing screen of FIG. 7, the user can freely construct the US module, for example, by making changes to connections between the components, between the connectors and between the components and connectors constituting the module, addition of a new component, deletion of any of the components, and so on. It is only the US module that can be freely constructed by the user; the respective constructions of the other S modules are fixed by "factory setting".

When a logical connection between the US module and another module is to be set on the CAD editing screen of FIG. 7, the user can set the desired logical connection by entering or selecting various logical connection conditions etc. via a logical-connection setting pop-up window that is deployed in response to user's clicking on the icon of any one of the input or output connectors. Alternatively, the desired logical connection may be set via the CAD editing screen by performing connection in generally the same manner as performed on the conventional CAD. For example, a mode for drawing lines is first activated, and the user starts drawing a line by clicking on any one of the input an output connector as a base point and then sequentially clicking on desired points. Thus, these points are sequentially connected by a line, and the logical connection setting operation is completed when the connecting line has reached a desired connector (i.e., destination connector).

The integrated CAD screen is created through a drawing process based on, for example, data indicative of current connection settings stored per module in a working memory for the integrated CAD (hereinafter "integrated CAD working memory"); the integrated CAD working memory may be implemented by the ROM or RAM within the PC 1 or hard disk.

FIG. 8 is a diagram explanatory of an example organization of the above-mentioned integrated-CAD working memory. More specifically, (a) of FIG. 8 shows module-specific or hardware-specific areas in the integrated-CAD working memory provided in the PC 1, and (b) of FIG. 8 shows example details of data stored in one of the module-specific or hardware-specific areas. Further, (c) of FIG. 8 shows "working memories" provided in memories of the "synthesizer C" and "engine C" (which may be provided in the flash memory 12 or RAM 22). Memories and control sections provided in the individual equipments (actual equipments) 2-6 and having the same functions as the corresponding areas in the integrated CAD working memories are each hereinafter called along with an adjective "local", to distinguish from the corresponding areas in the integrated CAD working memory.

In the integrated-CAD working memory of the PC 1, a "management data" area stores memory management data necessary for managing read/write addresses etc. of the integrated CAD working memory. "integrated CAD" working area has a "USM library" provided therein for storing various data to be used for realizing a user software module (USM) created by the user on the US-module CAD editing screen of FIG. 7, and this "integrated CAD" working area stores data related to formation of other CAD screens and CAD graphic images. Further, in a case where the icon of a given software module has been positioned or placed outside an engine on the integrated CAD screen of FIG. 4 (like the US module of the effector C indicated by a dotted line in FIG. 4), the working area of the given software module is created in this "integrated CAD" working area. Structure of an "integrated scene memory" will be later described with reference to FIG. 11.

The integrated CAD working memory also includes, as working areas to be used for remote control of each of the modules (equipments 2-6) belonging to the zone (i.e., group of the nodes constituting the music LAN 10), a "waveform I/O A" working area, "synthesizer C" working area, "mixer A" working area, "engine C" working area and "engine D" working area. Of the equipment-specific working areas, the "waveform I/O A", "synthesizer C" and "mixer A" working areas are working areas corresponding to the hardware modules (H modules) for implementing only the fixed functions corresponding to the respective equipment types. As one representative example of the structures of the working areas, (b) of FIG. 8 shows a structure of the "synthesizer C" working area. In each of the working areas corresponding to the H modules, there are stored an ID ("HM_ID"), "M current memory", "MN current memory", "MD library memory" and "MND library memory" of the H module. Further, as one example of the working areas corresponding to the engines C and D for implementing the software modules (S modules), (b) of FIG. 8 shows an example structure of the "engine C" working area. In the "engine C" working area, there are stored, for each S module implemented by the engine C, an ID ("SM_ID (#x)"), "M current memory (#x)", "MN current memory (#x)", "MD library memory (#x)" and "MND library memory (#x)". Here, the suffix mark "#x" is a unique number for identifying each individual software module implemented by the engine in question. As may be apparent from comparisons with the structures of the working memories of the "synthesizer C" and "engine C" shown in (c) of FIG. 8, the working areas for the individual equipments, provided in the integrated CAD working memory shown in (b) of FIG. 8 are generally similar in data structure to the working memories (local memories) of the hardware (actual equipments) shown in (c) of FIG. 8. This is because the integrated CAD working memory of the PC 1 is imitative of the working memories of the individual equipments in order to emulate setting, editing, etc. of various operational parameters of the individual equipments.

The "HM_ID" is an ID for identifying the type of the hardware module, and the "SM_ID" is an ID for identifying the type of the software module. With such IDs, it is possible to identify the structure of the operational data, per type of the hardware module or software module, in the integrated CAD software of the PC 1. Namely, when the icon of an H module has been positioned on the integrated CAD screen, an operational data set of the same data structure as the corresponding equipment is prepared in the integrated CAD working memory on the basis of the HM_ID of the H module, or when the icon of an S module has been positioned on the integrated CAD screen, an operational data set of a corresponding data structure is prepared in the integrated CAD working memory on the basis of the SM_ID of the S module. For example, because the mixer A_H module and the mixer A-2_S within the engine C of FIG. 4 are of the same module type, "mixer A", although they differ from each other in that the former is implemented by hardware and the latter is implemented by software, the two modules are assigned the same module ID in the instant embodiment; besides, in the instant embodiment, the operational data of the H module and S module are arranged to be compatible with each other. Therefore, in the instant embodiment, the operational data of H and S module assigned the same module ID (e.g., the mixer A_H module and the mixer A-2_S within the engine C) can be controlled on the same operational parameter setting screen (see FIG. 6). In an online state (to be later described), the working areas of the individual modules in the integrated CAD working memory shown in (a) of FIG. 8 (hereinafter also referred to as "individual modules of the integrated CAD software") and the working memories of the individual equipments (actual equipments) shown in (c) of FIG. 8 are associated with each other, through allocation of the individual equipments of the music LAN 10 to the individual modules of the integrated CAD software as will be later explained in relation to FIG. 22.

(a)-(d) of FIG. 9 show somewhat detailed examples of structures of the "M current memory", "MN current memory", "MD library memory" and "MND library" of FIG. 8. These current memories and library memories are provided in corresponding relation to various modules as will be later described; however, each of the current memories and library memories need not. by any means, be an independent hardware memory, and these current memories and library memories may be in the form of memory areas established in a hardware memory, such as a single RAM, hard disk or flash memory. To simplify the description, each of the current memories and library memories will hereinafter be referred to as "current" and "library", respectively. The "M current" shown in (a) is a set of current operational data (operational parameter) for the module corresponding to the working area in question. The "MN current" shown in (b) is a set of data concerning the current logical connection to the network (hereinafter referred to as current logical network connection data) for the module corresponding to the working area in question. The "MD library" shown in (c) is a library for storing a plurality of sets of the operational data (operational parameters) (MD1 data, MD2 data, . . . , MDn data) for the module corresponding to the working area in question. By designating a particular storage location in the MD library, the user can store the operational data set of the M current into the "MD library" as data of a scene, or call the data set, corresponding to the designated storage location, to the M current. Further, the "MND library" shown in (d) is a library for storing a plurality of sets of the logical network connection data (MND1 data, MND2 data, . . . , MNDm data) for the module corresponding to the working area in question. Thus, for the logical network connection data concerning a connection between modules too, the user, by designating a storage location in the MND data, can store a data set of the MN current into the MND library or call data, corresponding to the designated storage location, to the MN current. Here, the number n of data in the MD library and the number m of data in the MND library need not be identical to each other and, in general, may be in a relation of "n>m". This is because combinations of the operational data are diverse while combinations of the logical network connection data are not so diverse. In the case where the separate MD library and MND library are provided for the operational data and network connection data, respectively, as in the instant embodiment, it is possible to reduce the necessary capacity of the MND library that is generally required to store a relatively small quantity of data.

In each of the engine C working area in the integrated CAD memory shown in (b) of FIG. 8 and the engine C working memory (local memory) shown in (c) of FIG. 8, the "M current", "MN current", "MD library" and "MND library" are provided for each of the software modules "#x" implemented by the engine. Also, a plurality of sets of the operational data and a plurality of sets of the logical network connection data are stored, as a plurality of scene data, in the "MD library" and "MND library", respectively, for each of the software modules "#x".

Further, in an appropriate region of each of the working area of the engines in the integrated CAD working memory (in the illustrated example of (b) of FIG. 8, engine C working area) and working memories of the engines C and D (in the illustrated example of (c) of FIG. 8, engine C working memory), there are provided an "SM library" for storing data to implement a software module (SM) and a "C library" for storing various data to implement various components to be positioned on the CAD editing screen (see FIG. 7) for a US module. In (a) and (b) of FIG. 10, example structures of the "SM library" and "C library" are shown in some detail. Further, in (c) of FIG. 10, an example structure of a "USM library" is shown. The "USM library" is provided in each of the "integrated CAD working area" of the integrated CAD working memory (see (b) of FIG. 8) and working memories of the engines C and D ((c) of FIG. 8). In the "SM library", there are stored, for a plurality of S modules (SM1 data-SMn data), data for implementing the software modules (S modules), such as data for controlling signal processing of the S modules. According to the example of the CAD screen illustrated in FIG. 4, the data stored in the "SM library" include, for example, data of the individual S modules, i.e. "mixer A (mixer A-2)" implemented by the engine C and "mixer C" and "equalizer B" implemented by the engine D. Each of the S modules has unique ID information capable of uniquely identifying the S module; with such ID information, it is possible to designate a particular S module from among the data group stored in the "SM library". Further, each of the ID information corresponds to the ID of an S module stored as "SM_ID (#x)". Further, in the "USM library" shown in (c) of FIG. 10, there are stored, for a plurality of modules (USM1 data-USMn data), data for implementing user software modules (US modules). According to the example of the CAD screen illustrated in FIG. 4, the data stored in the "USM library" include, for example, data of the "effector C" implemented by the engine C. Each US module to be edited on the US module CAD editing screen of FIG. 7 has unique ID information capable of uniquely identifying the US module; with such ID information, it is possible to designate a particular US module from among the data group stored in the "USM library". Each of the ID information corresponds to the ID of an S module stored as "SM_ID (#x)". Further, in the "C library" shown in (d) of FIG. 10, there are stored, for a plurality of components on the US-module CAD editing screen (see FIG. 7), various data for implementing the components to be positioned on the US-module CAD editing screen, such as data indicative of the content of signal processing and data for controlling the signal processing of the individual components. Such data of the components are used to implement a US module.

Note that the data in the "SM library" and "C library" can not be edited by the user and can not be subjected to synchronization in a synchronization process that will be later described. In other words, the data in the PC 1 and the data in the individual actual equipments are set in advance to agree with each other (i.e., are synchronized with each other in advance).

The SM and USM libraries will be generically referred to as "M libraries" while the MD and MND libraries will be generically referred to as "D libraries", and differences between the M libraries and the D libraries may be outlined as follows.

The "M library" stores, for each individual module identified by the module ID (SM_ID), data defining the content of signal processing to be carried out by the DSP or PC in correspondence with the function of the module, data defining an operational data set to be given to the module so that the signal processing is controlled in accordance with the operational data set, and data to be used for editing the operational data set.

The "D library", on the other hand, stores, for one module, a plurality of operational data sets to be used in the module, and each of these operational data sets has a data structure corresponding to the module ID (HM_ID or SM_ID) of the module.

As set forth above, the integrated CAD working memory within the PC 1 includes working areas (various "currents" and "libraries") of all of the hardware modules and software modules belonging to the music LAN or zone (node group). In the PC 1, the integrated CAD screen, displaying connection conditions in the network as illustratively shown in FIG. 4, can be created on the basis of the data of the module-specific working areas in the integrated CAD working memory. Thus, in a case where a new module has been added to the music LAN or zone (node group), the working area of the new module is added to the integrated CAD working memory in the PC 1. Note that the integrated CAD working memory does not include working areas for "recorder" and "sequencer" functions implemented by the music software in the PC 1. Let it be assumed that such working areas for the "recorder" and "sequencer" functions are provided separately as working memories in the music software.

Further, it is assumed that, of the contents of the equipment-specific working memories shown in (c) of FIG. 8, storage regions for the various currents (i.e., local current memories) are provided in the RAM 22 (see FIG. 2) and that storage regions for the various libraries are provided in the flash memory 21 (see FIG. 2). Similarly, of the module-specific working areas in the integrated CAD working memory shown in (a) of FIG. 8, storage regions for the various currents are provided in the RAM 22 of the PC 1 and that storage regions for the various libraries are provided in a rewritable, non-volatile memory, such as the flash memory, of the PC 1.

Referring back to FIG. 4, an image of a button 34 indicated in an upper portion of the integrated CAD screen is a "collective synchronization instruction button". Collective synchronization process is carried out, in response to user operation of the collective synchronization instruction button 34, so as to achieve synchronization or agreement between the contents of the module-specific (remote controlling) working areas of the integrated CAD working memory ((a) of FIG. 8) in the PC 1 and the contents of the corresponding equipment-specific working memories ((c) of FIG. 8). More specifically, in the instant embodiment, the user can switch, through operation of the collective synchronization instruction button 34, between the online state where the contents of the CAD working memory in the PC 1 and the contents of the equipment-specific working memories are set or changed in interlocked relation to each other and an offline state where there is achieved no interlocked relation between the contents of the CAD working memory and the contents of the equipment-specific working memories. Further, a string of letters, indicative of which of the online and offline states is currently selected, is displayed on the collective synchronization instruction button 34 on the integrated CAD screen. Also, the modules in the online state and the modules in the offline state are indicated by differentiated display styles of the corresponding icons and inter-module connections. In the illustrated example of FIG. 4, the icons and connection lines in the online state are indicated by heavy lines. In FIG. 4, the letter string on the button 34 is "OFFLINE", and thus, the icons and inter-module connections in the offline state are displayed on the screen. Note that each of the processing modules implemented by the PC 1 is constantly kept in the online state as seen in the figure.

Once the above-mentioned collective synchronization instruction button 34 is clicked in the offline state, a collective synchronization confirmation screen illustratively shown in FIG. 12A is opened, on which the user can select a desired direction of synchronization. With the synchronization in the direction indicated by an arrow from "zone CAD" to "module", data can be transmitted collectively from the integrated CAD working memory in the PC 1 ((a) of FIG. 8) to the equipment-specific working memories ((c) of FIG. 8). With the synchronization in the direction indicated by an arrow from "module" to "zone CAD", on the other hand, data can be transmitted collectively in an opposite direction to the above-mentioned, i.e. from the equipment-specific working memories to the integrated CAD working memory. Then, once the user clicks on an image of an OK button, the collective synchronization process is performed in accordance with the selected direction of synchronization. Namely, synchronization control is performed, in accordance with the selected direction of synchronization, to achieve agreement in data contents between the module-specific working areas of the integrated CAD working memories in the PC 1 and module (i.e., actual equipment)-specific working memories. In FIGS. 8-10, the data corresponding to the individual equipments (i.e., data surrounded by heavy lines) are to be subjected to the synchronization control; further, scene memories corresponding to the individual equipments, provided in an integrated scene memory shown in FIG. 11, are also to be subjected to the synchronization control. As apparent from FIG. 8 or 10, the "SM libraries" and "C libraries" are not to be subjected to the synchronization control. This is because data in the "SM libraries" and "C libraries" are not subjects of editing by the user and are set in synchronized condition in advance.

Once a collective synchronization instruction is given by the user, the integrated CAD screen is switched to the online state as seen in FIG. 12C. The letter string "ONLINE" on the button 34 indicates that the integrated CAD screen is now in the online state, in which the individual icons and connection lines are displayed in heavy lines, In the online state, each operation by the user is communicated between the integrated CAD of the PC 1 and the individual modules so that operation on each of the operational parameter setting screens of the individual modules (see (a) and (b) of FIG. 6, and FIG. 7), opened under the integrated CAD software, is reflected in real time in the corresponding module (actual equipment), and operation by the user in a given module (actual equipment) is reflected in the operational parameter of the module in the PC. Note that details of the collective synchronization process by the integrated CAD software will be described later.

The following paragraphs describe control carried out in the individual equipments 1-6 using the above-described working memories, with reference to functional block diagrams of FIGS. 13-15. For convenience of illustration and explanation, the same reference characters are added to the same elements as the hardware resources of the equipments having been described above in relation to FIG. 2. Further, each "current" in these figures represents a functional module that has not only a function for storing operational data or logical connection data but also a management function for reading out, editing, copying, transferring the stored operational data or logical connection data, writing data to the operational data or logical connection data and performing other operations. The management function is provided as processing to be performed by the individual equipments or by the CPU of the PC 1.

FIG. 13 shows an outline of control arrangements in an equipment, such as the synthesizer 4 or waveform I/O device 6, which only implements a fixed function corresponding to the type of the equipment. In the figure, the signal processing section (DSP) 23 performs the fixed function (H module) corresponding to the type of the equipment. Namely, the content of signal processing, corresponding to the equipment type, to be performed by the DSP and control on the signal processing (e.g., function as a tone generator if the equipment is a synthesizer, or mixing function if the equipment is a mixer) are defined in advance, and the signal processing section 23 carries out operations corresponding to the fixed function of the module by use of current operational data (operational parameters) stored in the M current 40. Namely, the signal processing section 23 performs the signal processing on audio signals or MIDI signals (e.g., input signals of individual input channels) received via the WC_I/O 26 or NC_I/O 27 and then outputs the resultant processed signals via the WC_I/O 26 or NC_I/O 27. The operational parameters are various mixing parameters etc. if the equipment is the mixer 3, or tone color parameters etc. if the equipment is the synthesizer 4. Further, any desired one of the plurality of operational parameter sets stored in the D library (MD library) 41 can be called so as to collectively change settings of the operational parameters ("scene recall"), and the operational parameter set stored in the current M current 40 can be stored into the D library 41 ("scene store"); these operations correspond to a "scene function" well known in the field of digital audio mixers etc. Further, one set of logical network connection data for the module stored in the MN current 42 is supplied to the signal processing section 23 and NC_I/O 27, and a logical connection of the equipment in the music LAN 10 is set on the basis of the logical network connection data. Specific example of the logical connection scheme employable in the instant embodiment may be arranged such that a desired logical connection is made by, on the basis of the logical network connection data, assigning, to the equipment in question, a transmission channel for transmitting a signal to the music LAN 10 and a transmission channel for receiving a signal from the music LAN 10. Further, the scene store and scene recall can also be performed between the MN current 42 and the D library (MND library) 43. Further, in the online state, instructions for editing, scene store/recall, etc. of operational parameters for the equipment in question, given via the integrated CAD screen of the PC 1, are supplied to the equipment in question via the NC_I/O 27; thus, the stored contents of each of the currents in the equipment in question can be changed as the stored contents in the corresponding current of the PC 1 are changed and in the same manner as in the corresponding current of the PC 1 (see FIG. 16, etc. to be later explained).

Further, each of the hardware equipments has ID information (U_ID 44) unique to that equipment, and a hardware ID identifying a particular hardware type of that equipment (HW_ID 45). In the case of the equipment of the fixed function (H module), the H-module identifying ID (i.e., HM_ID of FIG. 8) of the equipment can be identified from the HW_ID 45. The ID information indicative of each of the equipment types may be constructed in any suitable manner, e.g., by representing the HW_ID 45 in first several bits of a data code composed of an appropriate plurality of bits and representing the U_ID 44 in all of the remaining bits of the data code.

FIG. 14 shows an outline of control arrangements in an equipment, such as the engine 2 or 5, implementing one or more functions corresponding to DSP-executed microprograms (i.e., S module). In FIG. 14, the one or more functions of the S module, implemented by the signal processing section 23, are identifiable by ID information stored, in the working memory of the engine (see (c) of FIG. 8), as SM_ID (#x) 50. Note that the engine is capable of implementing a plurality of S modules and the mark "#x" indicates the pluralism of S modules as noted above. In each of the M libraries ("SM" and "USM" libraries of FIG. 8) 51, there are stored data of a plurality of S modules or USM modules as noted above, and the data of the S or USM module corresponding to the SM_ID (#x) 50, i.e. data of the S module to be implemented, are given to the signal processing section 23. The signal processing section 23 performs signal processing in accordance with arithmetic algorithms (i.e., DSP-executed microprograms) and signal processing control corresponding to the data of the S module to be implemented and by use of a set of operational data stored in the corresponding M current 52. Scene store and scene recall can be performed between the M current 52 of each of the S modules #x and the D library (MD library) 53. Further, scene store and scene recall can be performed between the MN current 54 of each of the S modules #x and the D library (MND library) 55, in the manner as described above in relation to FIG. 13. In the M current 52 and MN current 54 of the engine, there are stored, for each of the plurality of S modules #x, one set of operational data and one set of logical network connection data. Further, in the D libraries (MD 53 and MND 55) M current 52 and MN current 54 of the engine, there are stored, for each of the plurality of S modules #x, a plurality of sets of operational data and a plurality of sets of logical network connection data. The engine too has ID information (U_ID 56) unique to the hardware equipment and hardware ID (HW_ID 57) uniquely identifying the type of the equipment. However, in the engine, the function of the equipment is identified by SM_ID. In the online state, instructions for editing, scene store, recall, etc. of operational parameters for the software module being implemented by the equipment in question, given via the integrated CAD screen of the PC 1, are supplied to the equipment in question via the NC_I/O 27; thus, the stored contents of each of the currents in the software module of the equipment in question can be changed as the stored contents in the corresponding current of the PC 1 are changed and in the same manner as in the corresponding current of the PC 1 (see FIG. 16, etc. to be later explained).

FIG. 15 outlines control arrangements of the PC 1. As already explained above in relation to FIG. 8, the currents and libraries in the integrated working memory of the PC 1 are provided in corresponding relation to all of the modules belonging to the music LAN 10 (current zone). In FIG. 15, HM currents (#x) 60 are remote-controlling M currents (H-module-specific operational data sets) for the individual equipments implementing various H modules. Each of the H-module-specific operational data sets in the HM currents (#x) 60 is identified by HM_ID (#x) 61 that uniquely identifies the type of the H module. Further, scene store and scene recall can be performed, for each of the H modules, between the HM current 60 and D library (MD library) 62.

In SM currents (#x) 63, there are contained sets of operational data of individual S modules (#x) in the music LAN 10. Set of library data (i.e., data indicative of the content of signal processing, how to control the signal processing, how to edit the operational data, etc.) of a desired S module or USM module within the SM currents (#x) 63 is designated in accordance with SM_ID (#x) 64, and data (i.e., operational parameter editing data) of the S module or USM module corresponding to SM_ID (#x) 64 are supplied from the M library 65 to the SM current (#x) 63. When remote control is being performed, via the SM current (#x) 63, on an S module implemented by an engine in the music LAN 10, the content of editing of the operational data of the SM currents (#x) 63, performed via the PC 1 in the online state, is sent to the music LAN 10 via the NC_I/O 27, so that the corresponding engine received the data. Further, when an S module implemented by the PC 1 is being controlled via the SM current (#x) 63, a set of library data (indicative of the content of signal processing and how to control the signal processing) of the S module or USM module is supplied from the M library 65 to the signal processing section 66, and data for editing operational data are supplied to the SM current (#x) 63, so that the PC 1 implements an S module function using the operational data of the SM current (#x) 63. In such a case, because the subject of control is the signal processing section 66 in the PC 1, the operational data of the SM current (#x) 63 are not sent to the music LAN 10. Further, for any one of the S modules, scene store and scene recall can be performed between the SM current and the D library (MD library) 67 of the software module #x. Further, data transmission and reception between the modules in the online state is carried out in a manner similar to the above-described.

Further, in the MN current (#x) 68, there are stored current logical connection data sets for all of the modules belonging to the music LAN 10 (current zone). In the D library (#x) 69, there are stored a plurality of logical connection data sets for the individual modules. Scene store/recall is performed between the MN current 68 and the MND library 69 in a manner similar to the above-described.

In the online state, the content of each editing/change made to any one of the currents and libraries is sent to the music LAN 10 via the NC_I/O 27 so that the editing/change is executed in the corresponding equipment. Further, if scene store or screen recall has been performed in the online state, a scene store or screen recall instruction is sent to the music LAN 10 via the NC_I/O 27 so that scene store/recall control corresponding to the scene store or screen recall instruction is performed in the corresponding module.

Further, in FIG. 15, a sequencer function 70 and recorder function 71 are fundamental functions of the music software installed in the PC 1, which correspond to the "sequencer A_S module" and "recorder D_S module" shown in FIG. 4. These sequencer function 70 and recorder function 71 perform recording/reproduction of song data 72, i.e. track-by-track audio waveform data and MIDI data. Here, the song data 72 has recorded therein only triggers of the track-by-track audio waveform data, i.e. track-by-track tone generation timing and waveform designating data, and the audio waveform data are separately managed in a waveform data memory 73 separately from the track-by-track tone generation timing and waveform designating data. In data reproduction, audio waveform data designated by the waveform designating data are read out from the waveform data memory 73 at the tone generation timing of the song data. For the sequencer function 70 and recorder function 71 too, there are provided a current memory storing the current operational data set, and a library memory storing a plurality of operational data sets; scene store/recall can be performed between the current memory and the library memory, although not specifically shown.

Further, in FIG. 15, a section surrounded by a dotted line is managed as a single song file. Namely, the single song file is arranged to include a module-specific operational data set (M current) per module, a inter-module logical network connection data set (MN current) per module, and MD and MND libraries each storing a plurality of sets of these data per module. Thus, with the integrated CAD software in the PC 1, it is possible to collectively store and read out the operational data and inter-module logical network connection data sets for all of the modules belonging to the music LAN 10 (current zone). Further, as shown, the song file includes only the song data 72 specifying waveform data without including waveform data themselves, and thus, the necessary data quantity can be reduced. Further, data can be recorded to a removable storage device, such as a hard disk, in song files. Although not shown, data of the integrated CAD stored in the song file also includes respective unique U_ID information of a plurality of equipments displayed on the screen of FIG. 4 or (b) of FIG. 12.

The following paragraphs describe the scene store/scene recall function performed by the integrated CAD software according to the instant embodiment.

Referring back to FIG. 8 and to (a) of FIG. 8 in particular, the integrated CAD working memory in the PC 1 includes the "integrated scene memory" area, in which are stored control data (scene designating data) for permitting collective scene control of operation settings, logical connection settings, etc. of the individual modules in the network. With the CAD software according to the instant embodiment, it is possible to perform collective management (scene store/recall) of the respective operation settings and inter-module logical connection settings of the modules constituting the music LAN 10 as a single scene.

FIG. 11 is a diagram showing in detail an example structure of the "integrated scene memory". In a "management data" area shown in (a) of FIG. 11, there are stored memory management data necessary to manage read/write addresses of the "integrated scene memory". In an "integrated CAD scene memory" area, there are stored, for each of a plurality of scenes, data designating storage locations etc. of CAD data necessary for creation of an integrated CAD screen and CAD graphic images pertaining to the scene. If there is any S module located outside an engine on the integrated CAD screen of a given scene, scene designating data for performing control of the given scene are also stored in the integrated CAD scene memory. As shown in (a) of FIG. 11, the "integrated scene memory" includes, in corresponding relation to the modules 1-6 in the music LAN 10, a plurality of scene memory areas, i.e. "music software scene memory" area, "waveform I/O A scene memory" area, "synthesizer C scene memory" area, "mixer A scene memory" area, "engine C scene memory" area and "engine D scene memory" area. The "music software scene memory" area has stored therein, for each of a predetermined plurality of scenes, scene designating data (i.e., data designating a data number corresponding to a storage location of the scene) for performing scene control pertaining to the "recorder" function and "sequencer" function implemented by the music software of the PC 1. The five scene memory areas other than the "music software scene memory" will be referred to as "scene memory areas for the modules 2-6".

In each of the scene memory areas, such as the "waveform I/O A scene memory" area, "synthesizer C scene memory" area and "mixer A scene memory" area, corresponding to modules for implementing H modules, there are stored memory management data and scene designating data for each of a predetermined plurality n of scenes (scene 1-scene n), as illustratively shown in (b) of FIG. 11 in relation to the "synthesizer C scene memory" area. Each of the scene designating data, as seen in (c) of FIG. 11, includes data "MDp" for designating operational data, and data "MNDp" for designating logical network connection data. The operational data designating data "MDp" is data that designates a data number corresponding to a storage location, in the "MD library", of the module in question ("synthesizer C" in the illustrated example) to thereby specify one set of "operational data" to be called in the scene in question. The logical network connection data designating data "MNDp" is data that designates a data number corresponding to a storage location, in the "MND library", of the module in question to thereby specify one set of "logical network connection data" for the scene in question.

Each of the working areas corresponding to engines implementing S modules too includes memory management data and scene designating data for each of a predetermined plurality n of scenes (scene 1-scene n), as illustratively shown in (b) of FIG. 11 in relation to the "engine C scene memory" area. In this case, each of the scene designating data, as seen in (c), "number of modules" data indicative of the number of S modules (including US modules), data "SMp" for designating types of S modules (including US modules, operational data designating data "MDP", and logical network connection data designating data "MNDp"; the data "SMP", "MDp" and "MNDp" provided here correspond in number to the S modules to be implemented in the scene by the engine. (c) of FIG. 11 shows a case where the number of the S modules is two and thus there are stored two "SMp" data, two "MDp" data and two "MNDp" data. Each of the data "SMp" for designating a type of an S module is data that designates a data number corresponding to a storage location, in the "SM library" or "USM library", of the engine in question to thereby specify an S module or US module to be called in the scene in question. Similarly to the above-described, "MDp" and "MNDp" are data that designate data numbers corresponding to storage locations, in the "MD library" and "MND library", of the engine in question to thereby specify one set of operational data and one set of logical network connection data, respectively, to be called in the scene in question.

As shown in FIG. 11, the "integrated scene memory" area in the integrated CAD working memory in the PC 1 includes scene memory areas for the individual modules 1-6 in the music LAN 10, and scene data stored in the scene memory of each of the modules include data designating a storage location, in the D library or M library, of each of the modules, i.e. link data to data in the library of each of the modules. Further, each of the equipments 2-6 in the music LAN 10 also includes a scene memory for performing scene control in the equipment, and each scene in the each of the equipments 2-6 can be composed of link data to data to the corresponding library (see (c) of FIG. 8). In the online state, the scene memory areas for the individual modules 2-6 in the integrated scene memory and the scene memories for the equipments 2-6 in the music LAN 10 are associated with each other, through allocation of the individual modules to the individual equipments as will be later explained in relation to FIG. 22. In this case, the "synthesizer C scene memory" area in the integrated CAD working memory, for example, has the same data structure and data contents as the scene memory of the synthesizer C (actual equipment). Namely, because each of the equipments 2-6 has the above-mentioned libraries (see (c) of FIG. 8) and scene memory, the integrated CAD working memory of the PC 1 too has the "integrated scene memory" constructed in the same manner as the each of the equipments 2-6. Because the integrated CAD working memory of the PC 1 and the scene memories of the individual equipments 2-6 and the libraries to which individual scenes are to be linked, are made similar in structure, it is possible to achieve "seamless scene control" such that the operational parameter settings and logical connection settings of the plurality of types of modules in the music LAN 10 can be collectively managed by the integrated CAD software.

Now, a scene store process will be described with reference to FIGS. 16A and 16B, and a scene recall process will be described with reference to FIG. 17. More specifically, FIG. 16A is a flow chart showing an example operational sequence of a process performed by the PC 1 in response to a scene store instruction given, via the integrated CAD screen of the PC 1, for storing a current scene. What are to be scene-stored here are currently-used operational data and logical connection settings in all of the modules belonging to the music LAN 10. When current settings are to be stored as a scene, the user gives a scene store instruction by designating a desired scene number for the scene. Once such a scene store instruction is given by the user, a determination made at step S1 as to whether the integrated CAD software of the PC 1 and the individual equipments 2-6 are currently in the online state. With a YES determination at step S1, a scene store event is sent to each of the equipments 2-6, at step S2. Each of the equipments 2-6, having received the scene store event, performs a process as flowcharted in FIG. 16B.

After the scene store event has been sent to each of the equipments 2-6, or if the integrated CAD software of the PC 1 and the equipments 2-6 are currently in the offline state as determined at step S1, the PC 1 performs operations at and after step S3 for recording, as a new scene, current data stored for the individual modules (individual S modules to be implemented, in the case of the engine) in the integrated CAD working memory. More specifically, one of the modules which is to be first subjected to the scene recording or storage is designated at step S3, and then, at step S4, a determination is made, for each of the modules, as to whether or not any editing has been made to data most recently read out from the library into the corresponding current memory. Namely, it is determined whether or not the user has made any change to a data set in the current memory after readout of the data set from the library into the current memory. If editing has been made (YES determination at step S5), the current data in the current memory of the module in question is stored, as a new data set, into an appropriate storage location of the corresponding library and assigned a data number, at step S6. Then, the new data number assigned to the data set is stored into the region MDp or MNDp (see FIG. 11) of the scene number in the scene memory area of the module in question, at step 7. If, on the other hand, no editing has been made to the data read out most recently from the library data into the current (NO determination at step S5), the data number (storage location) of the data most recently read out from the library is stored, at step S8, into the region MDp or MNDp of the scene number in the scene memory area of the module in question. If the module in question is an S module, data indicative of the type of the module is stored into the region SMp, and further, if the module in question is now being activated in the engine, the number of modules is also recorded. The operations of steps S4-S8 are performed for both the M current and the MN current, and thus, the scene store process is carried out for the module in the PC 1. Another module to be next subjected to the store process is designated at step S9, and, if it is determined there is any module remaining to be subjected to the store process (YES determination at step S10), then the operations of steps S4-S8 are performed for the designated module. By the aforementioned operations being performed on all of the modules in the music LAN 10, a set of the current operational data and logical connection settings of all of the modules in the music LAN 10 can be stored as scene data.

FIG. 16B is a flow chart showing an example operational sequence of a process performed by each of the equipments 2-6 in response to reception of a scene store event from the PC 1. At step S11, similarly to step S4 in the process performed by the PC 1, a determination is made, for each of the current memories of the working memory of the module in question, as to whether or not any editing has been made to data most recently read out from the corresponding library to the current memory. If editing has been made (YES determination at step S12), the edited current data in the current memory is stored, as a new data set, into an appropriate storage location of the corresponding library and assigned a data number, at step S13. Then, the new data number assigned to the data set is stored, at step S14, into a region of the scene number in the scene memory area of the module in question. If, on the other hand, no editing has been made to the data read out most recently from the libraries into the current (NO determination at step S12), the data number of the data most recently read out from the libraries is stored into the region of the scene number in the scene memory area of the module in question, at step S15. In the above-described manner, the scene store process is performed for the designated module in each of the equipments. In the case where the engine is implementing a plurality of S modules, the above-described scene store process is carried out for each of the S modules.

FIG. 17A is a flow chart showing an example operational sequence of a process performed by the integrated CAD software in response to a scene recall instruction given via the integrated CAD screen of the PC 1. The user gives the scene recall instruction, designating a desired scene number. Once the scene recall instruction is given by the user, a determination is made at step S16 as to whether the integrated CAD software of the PC 1 and the individual equipments 2-6 are currently in the online state. With a YES determination at step S16, a scene recall event is sent to each of the equipments 2-6, at step S17. Each of the equipments 2-6, having received the scene recall event, performs a process as flowcharted in FIG. 17B.

After the scene recall event has been sent to each of the equipments 2-6, or if the integrated CAD software of the PC 1 and the equipments 2-6 are currently in the offline state as determined at step S16, the PC 1 performs operations at and after step S18 for performing a scene recall process for each of the modules in the integrated CAD working memory. Namely, one of the modules which is to be first subjected to the scene recall process is designated at step S18, and data number designating data (MDp, MNDp and SM of FIG. 11) in each of the corresponding libraries of the module are acquired on the basis of the scene number of a scene to be recalled for the module in the integrated CAD scene memory of FIG. 11, at step S19. At following step S20, a set of operational data and a set of logical connection data, corresponding to the acquired data numbers, are read out from the corresponding libraries for the module in the integrated CAD memory of the PC 1 to the current memories of the module, so as to recall the scene. If the module in question is an S module, a determination is made as to whether the thus-acquired SMp is indicative of the same type as the S module to be currently processed. If so, the current memories corresponding to the module in question are used as-is for the scene recall; however, if the thus-acquired SMp is not indicative of the same type as the S module to be currently processed, current memories of a data construction corresponding to the acquired SMp are prepared and used for the scene recall. At step S21, another module to be next subjected to the recall process is designated at step S21, and, if there is any module remaining to be subjected to the recall process (YES determination at step S22), then the operations of steps S19-S21 are performed for the designated module. By the aforementioned operations being performed on all of the modules in the music LAN 10, the desired scene can be recalled for the operational data and logical connection settings of all of the modules in the music LAN 10.

FIG. 17B is a flow chart showing an example operational sequence of a process performed by each of the equipments 2-6 in response to reception of a scene recall event from the PC 1. Each of the equipments 2-6, having received the scene recall event, acquires data number designating data (MDp, MNDp and SMp of FIG. 11) from the individual libraries of the module in question (step S23), reads out data of the thus-acquired data number to the individual current memories, to thereby perform the scene recall (step S24). If the equipment is an engine, for example, a determination is made as to whether the thus-acquired SMp is indicative of the same type as the S module to be currently processed. If so, the current memories corresponding to the module in question are used as-is for the scene recall; however, if the thus-acquired SMp is not indicative of the same type as the S module to be currently processed, current memories of a data construction corresponding to the acquired SMp are prepared and used for the scene recall. Further, if the engine is currently implementing a plurality of S modules, the above-described scene recall process is performed on each of the S modules.

In the instant embodiment, control may be performed such that the scene store/recall be instructed separately for each of the modules as in the conventionally-known techniques, rather than the above-described control where the scene store/recall is instructed collectively for all of the modules in the music LAN 10.

Once the user operates any of the operators, such as the buttons and knobs on the operational parameter setting screen (FIG. 6) of any one of the modules, the parameter in the current memory of the module in question, which corresponds to the operated operator, is changed in value. FIG. 18 is a flow chart outlining a process performed by the integrated CAD software in response to operation on the operational parameter setting screen. Once a given parameter is changed in value in the PC 1, a determination is made, at step S25, as to whether the PC 1 and the individual equipments 2-6 are in the online state. With a YES determination, a change event of the parameter value is sent at step S26 to each of the equipments (modules), and the corresponding parameter value in the current memory for the module in the PC 1 is changed at step S27. If the PC 1 and the equipments 2-6 are currently in the offline state, the operation of step S27 is carried out without the operation of step S26 being carried out. Each of the equipments (modules), having the parameter value change event, changes the corresponding parameter value in its current memory.

Condition in which any of various parameters of the current memories of the module is changed not limited to when any one of the operators corresponding to various parameters on the operational parameter setting screen for the module has been operated; other possible conditions are when recall operation (not recall of a scene) has been performed on any of the libraries of the module via the setting screen, and so on. During the online state, it is only necessary to periodically check whether or not synchronization is currently maintained between operational data in the PC 1 and in the individual currents of the working memory of each of the equipments 2-6. For example, the operational data may be divided into blocks in an appropriate manner and respective checksums of the blocks may be sent from each of the equipments 2-6 to the PC 1 so that the PC 1 can confirm agreement between the checksums of the equipments 2-6 (i.e., whether or not synchronization is currently lost). If loss of the synchronization has been detected in any of the blocks of a given one of the equipments, data of that block are transferred, in accordance with an instruction by the user or automatically, from the PC 1 to the equipment (or from the equipment to the PC 1) so that the block received by the equipment (or PC 1) can be overwritten to the current memory to thereby restore the synchronization. Thus, when the synchronization is partly lost, this scheme can readily restore the synchronization only through transfer of the deficient block.

On the integrated CAD screen of FIG. 4, the user can perform operation for editing the network, such as addition of a module icon and setting/change of an inter-module connection, through operation of GUI objects.

In an upper portion of the integrated CAD screen, several menu buttons or tabs are displayed in a row. Once the user clicks on the "Devices" menu button via the mouse, a pop-up menu is opened for devices, on which is displayed a list of hardware modules that can be added to the music LAN 10 (i.e., devices having remote controlling software plugged therein). The user can select a desired hardware module from the displayed list so that the icon of the selected hardware module can be additionally displayed on the integrated CAD screen.

Further, once the user clicks on the "Modules" menu button via the mouse, a pop-up menu is opened for software modules, where is displayed a list of S modules that can be added to the music LAN 10; namely, a list of S modules or US modules contained in the M libraries (see, for example, FIG. 8) is displayed in the pop-up menu. Hereinafter, the terms "S modules" are used to refer to not only S modules but also US modules, unless specified otherwise. The user can select a desired software module from the list so that the icon of the selected software module can be additionally displayed on the integrated CAD screen. At that time, a location to which the S module is to be added, i.e. whether the S module is to be implemented by the PC1 or by the engine 2 or 5 in the network, can be selected as desired.

FIGS. 19A-19C are flow charts of processing performed by the integrated CAD software when an S module is to be newly allotted. Once an allotment event of a new S module is detected, a determination is made, at step S30 of FIG. 19A, as to whether the new S module is to be allotted to an engine or to the PC. If the new S module is to be allotted to an engine as determined at step S30, the process goes to step S31, where a process for allotting the new S module to the engine is carried out as illustrated in more detail in FIG. 19B. If the new S module is to be allotted to the PS as determined at step S30, on the other hand, the process goes to step S32, where a process for allotting the new S module to the PC 1 is carried out as illustrated in more detail in FIG. 19C. After completion of the new S module allotment process at step S31 or S32, the display on the integrated CAD screen is updated at step S33 to display the icon of the new S module.

FIG. 19B shows the process performed by the PC 1 for allotting the new S module to an engine. At step S34, data specified by SM_ID (or USM_ID) of the new S module are read out from the SM library (or USM library) of the integrated CAD working memory (see FIG. 8). At following step S35, the capacity (arithmetic capability etc.) of resources of the engine, in which the S module is to be allotted, are checked, and the engine resources to be used to implement the S module in question are allocated. After completion of the engine resource allocation (i.e., with a YES determination at step S36), and if the integrated CAD software is currently in the online state (YES determination at step S37), the process goes to step S38, where allotment event data of the new S module, read out at step S34, is transmitted, along with resource designating data indicative of the resources allocated at step S35, to the engine to which the S module is to be allotted. Then, the engine, having received the new S module allotment event data and resource designating data, uses the designated engine resources to activate the new S module corresponding to the allotment event, at which time corresponding current memories (M and MN currents) are also created. Then, at step S39, current memories (M and MN currents) are created in the working area of the engine in the integrated CAD working memory of the PC 1, to prepare for remote control of the S module. Note that the operation of step S38 is not performed in the offline state (i.e., NO determination at step S37).

In case the resource allocation has failed due to a resource shortage or the like (NO determination at step S36), a predetermined error operation is carried out at step S40 to make a visual error indication (e.g., indication of an appropriate message like "resource shortage") on the display device of the PC 1.

FIG. 19C shows a process performed by the PC 1 for allotting a new S module to the PC. At step S41, data specified by SM_ID of the new S module are read out from the SM library of the integrated CAD working memory, in a similar manner to step S34. At following step S42, the remaining quantities of resources of the PC 1 (remaining arithmetic capability of the CPU, memory capacity of the RAM and the like, etc.) are checked, and the resources to be used by the PC 1 to implement the S module in question are allocated. After completion of the resource allocation (i.e., with a YES determination at step S43), the process goes to step S44, where current memories (M and MN currents) of the module are created in the PC 1 and then the S module is activated. In this case, the function of the S module is implemented as one of signal processing functions in the PC as indicated at 66 in FIG. 15. In case the resource allocation has failed due to a resource shortage or the like (NO determination at step S43), a predetermined error operation is carried out at step S45 in a manner similar to the above-described. If the error operation has been carried out at step S40 or S45, it means that activation of the new module S has failed, and thus, the icon of the S module is not displayed at following step S33.

Further, the user can move the position of any desired S module on the integrated CAD screen of FIG. 4. Movement of the position of a desired S module may be instructed by the user performing drag and drop operation, using the mouse, of the icon of the S module to be moved on the integrated CAD screen. In FIG. 4, movement, to the PC 1, of the "effector C_US module" is indicated by dotted lines as an example of the S module position movement. FIG. 20A outlines an S module movement process performed in response to an S module movement event in the PC 1. As seen from steps S46-S49 of FIG. 20, such S module position movement takes place when an S module implemented by the PC is to be moved to an engine (step S47) or when an S module implemented by an engine is to be moved to the PC (step S49). Detailed operational sequence of the S module movement process when an S module is to be moved to an engine is shown in FIG. 20B, while detailed operational sequence of the S module movement process when an S module is to be moved to the PC is shown in FIG. 20C. On the integrated CAD screen, an icon display of the S module is updated, at step S50, in response to user's operation for moving the S module.

When an S module implemented by the PC is to be moved to an engine (i.e., destination or moved-to engine), a determination is made, at step S51 of FIG. 20B, as to whether the logical connection of the S module can be changed in accordance with movement of the S module. Here, it is determined whether the same connection as the S module before the movement can be used in the S module to be newly activated in the destination or moved-to engine, i.e. the PC 1 checks connecting resources, such as available bands in the network, available ports of the NC_I/O 27 in the destination engine and available processing steps in the signal processing section 23. If connection change is possible (YES determination at step S52), the process moves on to step S53, where the process for allotting the new S module to an engine of FIG. 19B is carried. In preparation for remote control of the new S module in the destination engine (step S39 of FIG. 19B), operational data (contents of the M current) of the S module that was being implemented before the movement are transmitted via the music LAN to the M currents prepared for the remote control of the new S module, so that the operational data are set in the prepared M currents. After successful completion of the new S module allotment process (YES determination at step S54), a change is made to the inter-module connection (logical connection) condition of the newly-placed S module, at step S55. Namely, logical connection data of the new S module and module to which the new S module is to be connected (i.e., to-be-connected module) are created, on the basis of the logical connection data of the S module and connected-to module, in such a manner that the same logical connection as that of the S module that was being implemented by the PC 1 (i.e., moved-from PC) can be achieved. Then, the thus-created logical connection data of the new S module and connected-to module are stored into the respective MN currents. Further, if the current state is the online state, the created logical connection data are transmitted to and set in each of the engines implementing the new S module and connected-to module to thereby achieve setting of the desired logical connection. Further, control of the S module in question that has so far been implemented by the PC 1 is terminated, and each of the currents of the working memory corresponding to the SM_ID of the S module in question is opened at step S56; that is, at this step, the association between the currents and the software module is cancelled to make the currents available for other processing. If the connection change of the S module is impossible (NO determination at step S52), or if the new S module allotment process has failed (NO determination at step S54), a predetermined error operation is carried out at step S57, for example, to make a visual error indication.

The above-described operation of step S51 for determining whether or not the logical connection of the S module can be changed and the connection change operation of step S55 will be later described in detail.

When an S module implemented by an engine is to be moved to the PC, a determination is made, at step S58 of FIG. 20C, as to whether the logical connection of the S module can be changed. Here, it is determined whether the same connection as the S module before the movement can be used in the S module to be newly activated in the destination PC (or moved-to PC) 1; namely, connecting resources, such as available bands in the network, available ports of the network interface in the moved-to PC 1 and available processing capability of the CPU, are checked. If connection change is possible (YES determination at step S59), the process moves on to step S60, where the process for allotting the new S module to the PC as flowcharted in FIG. 19C is carried out. When the new S module is to be activated in the PC (step S44 of FIG. 19C), operational data (contents of the M current) of the S module that was being implemented by the engine before the movement are set into the M current prepared for the remote control of the new S module, in which case however the operational data need not be transmitted in the music LAN. After successful completion of the new S module allotment process (YES determination at step S61), a change is made to the inter-module connection of the newly-placed S module, at step S62. Namely, logical connection data of the new S module and connected-to module are created, on the basis of the logical connection data of the S module and connected-to module, in such a manner that the same logical connection as that of the S module that was being implemented by the moved-from engine can be provided. Then, the thus-created logical connection data of the new S module and connected-to module are stored into the respective MN currents. Further, if the current state is the online state, the created logical connection data are transmitted to each of the engines implementing the new S module and connected-to module to thereby achieve setting of the desired logical connection.

If the integrated CAD software of the PC 1 is in the online state (YES determination at step S63), the process goes to step S64, where a deactivation event of the S module is transmitted to the engine implementing the S module to thereby deactivate the S module in the engine. If the integrated CAD software of the PC 1 is in the offline state (NO determination at step S63), however, no deactivation event of the S module is transmitted to the engine. At step S65, remote control of the S module in the PC 1 is terminated, and the individual currents in the working area, corresponding to the SM_ID of the S module, in the integrated CAD working memory are made available for other processing in the same manner as at step S56. If the connection change of the S module is impossible (NO determination at step S59), or if the new S module allotment process has failed (NO determination at step S61), a predetermined error operation similar to the aforementioned is carried out at step S66. If such an error operation has been carried out at step S57 or S66, it means that the movement of the S module has failed, and thus, the icon of the S module is not moved at subsequent step S50.

Further, on the integrated CAD screen of FIG. 4, the user can perform operation for setting or changing any one of the logical connections (i.e., inter-module logical connections via audio transmission lines or MIDI transmission lines) between the modules. The inter-module logical connection may be made, for example, by the user designating a desired inter-module connection 1) by operating of any of the GUI objects of connections (i.e., audio transmission lines or MIDI transmission lines) by use of a pointing device, such as the mouse, 2) by first selecting the icon of a desired module to cause a pop-up window to be opened in response to the selection of the icon and then entering various connection conditions etc. via the pop-up window, or 3) via the module CAD editing screen described above in relation to FIG. 7. Further, the inter-module connection is also changed at the time of the S module movement process, as set forth above in relation to FIG. 20, Furthermore, when an S module has been newly allotted (see FIG. 19), similar connection setting is performed for the S module.

Now, with reference to FIG. 21, a description will be made about a process performed by the integrated CAD software in response to an instruction for setting/changing an inter-module connection. At step S67, a determination is made as to whether the instructed setting/change of an inter-module connection is to be made within a same equipment. For example, if the instructed setting/change concerns a connection between two S modules implemented within one engine, such as the connection between the mixer A-2 and the effector C of FIG. 4, or a connection between two S modules implemented within the PC, a YES determination is made at step S67. Thus, it can be ascertained whether or not the connection in question uses the network of the music LAN.

If the instructed setting/change of the inter-module connection is to be made within a same equipment (YES determination at step S67), then a further determination is made, at step S68, whether the instructed inter-module connection setting/change is possible or not. Here, allocation of resources (e.g., internal register of each DSP in the signal processing section 23 and communication line between DSPs in the signal processing section 23) within the equipment which are need for the instructed inter-module connection setting/change. In the resource allocation, arithmetic resources, such as memory regions, are allocated if the instructed connection setting/change is within the PC, and arithmetic resources and resources for connection between S modules are allocated if the instructed inter-module connection setting/change is within an engine. If the instructed inter-module connection setting/change is possible (YES determination at step S69), and if the integrated CAD software of the PC 1 is in the online state (YES determination at step S70), the process moves on to step S71, where a connection event, instructing a connection, is transmitted, along with resource designating data corresponding to the allocation of step S68, to an equipment (more specifically, engine) where the connection is to be performed. The engine, having received the connection event and resource designating data, uses resources therein, indicated by the resource designating data, to execute the connection between S modules as indicated by the connection event. Note that, if the inter-module connection is to be performed within the PC, transmission of the connection event is unnecessary even in the online state. Further, in the offline state (NO determination at step S70), the connection event is not transmitted. At step S72, settings of the connection for the equipment are added in the PC 1. Namely, when the inter-module connection is to be made within the PC, settings of the connection are written for the two S modules (i.e., transmitting and receiving S modules) to be controlled by the PC 1, while, when the inter-module connection is to be made within an engine, settings of the connection are written, for the two S modules (i.e., transmitting and receiving S modules), into the working area of the engine in the integrated CAD working memory of the PC 1. If the instructed inter-module connection setting/change is impossible (NO determination at step S69) due to resource shortage or the like, a predetermined error operation is carried out at step S73, for example, to make a visual error indication.

If the instructed inter-module connection setting/change is to be made between two equipments (NO determination at step S67), it means that the connection setting/change is to be made via the network of the music LAN 10, and thus, the process branches to step S74, where an operation is carried out for ascertaining whether or not the instructed inter-module connection setting/change is possible and for performing not only resource allocation at the transmitting and receiving equipments (e.g., allocation of arithmetic resources, connection resources of the S module and network connection ports) but also allocation of communication bands of the network (e.g., allocation of transmission channels). If the instructed inter-module connection setting/change is possible (YES determination at step S75), and if the integrated CAD software of the PC 1 is currently in the online state (YES determination at step S76), the process goes to step S77, where the connection event and resource designating data corresponding to the allocation of step S74 are transmitted to the two equipments for which the connection is to be made. If one of the two equipments for which the connection is to be made is the PC (i.e., if the transmitting or receiving module is an S module in the PC), the connection event is transmitted to only the other equipment (i.e., equipment other than the PC). At step S78, settings of the connection for the transmitting equipment (i.e., settings for sending data from the module in question to the music LAN 10) are written into the integrated working memory of the PC 1, and settings of the connection for the receiving equipment (i.e., settings for allowing the module in question to receive data from the music LAN) are written into the integrated working memory of the PC 1. If the transmitting end is an S module of an engine, the above-mentioned settings for sending data from the transmitting equipment are, for example, settings as to from which output of the S module a signal is to be supplied to the NC_I/O 27 and through which transmission channel and as which data of the transmission channel the signal is to be output via the NC_I/O 27. If the transmitting end is an equipment implementing H module, the settings for sending data from the transmitting equipment are, for example, settings as to from which output of the H module a signal is to be output and through which transmission channel and as which data of the transmission channel the signal is to be output. If the receiving end is an S module of an engine, the above-mentioned settings are, for example, settings as to which data of which transmission channel is to be received via the NC_I/O 27 and to which input of the S module the received signal is to be input. Further, if the receiving end is an H module of an engine, the above-mentioned settings are, for example, settings as to which data of which transmission channel is to be input and to which input of the H module the data is to be directed.

If the instructed inter-module connection setting/change is impossible (NO determination at step S75) due to, for example, a shortage of any of resources of the transmitting and receiving equipments and communication resources of the network, a predetermined error operation is carried out at step S79, for example, to make a visual error indication.

When the "effector C_US module" is to be moved from the engine C to the PC 1 as indicated in FIG. 4 by dotted lines, the connection change process explained above in relation to FIG. 21 is carried out at step S26 of the S module movement process described above in relation to FIG. 20. In this case, a process for moving the effector C_US module from the engine C to the PC 1 through the operational sequence of FIG. 20C is performed, so that control of the effector C_US module, having so far been implemented in the engine C, is terminated. Also, remote control of the S module by the integrated CAD software of the PC 1 is terminated and an S module, compatible with the S module (effector C) is activated in the PC 1. Here, operational data and logical connection data of the S module, which have so far been executed by the engine, are transferred and set into the S module implemented by the PC 1. Thus, through the process shown in FIG. 21, the connection between the effector C and mixer A-2 in the engine C is changed, through the movement process, to a connection between the effector C of the PC 1 and the mixer A-2 of the engine C. Note that an S module implemented by the PC 1 can also be moved into an engine in an opposite manner to the example of FIG. 4.

Now, with reference to FIG. 22, a description will be given about processes performed by the integrated CAD software in response to a collective synchronization instruction. Once the user clicks on the above-mentioned collective synchronization instruction button 34 while the integrated CAD software is in the offline state (i.e., while "OFFLINE" is being indicated on the button 34), a collective synchronization instruction event is output, so that the PC 1 starts a process of FIG. 22A. At step S80, the collective synchronization instruction screen of FIG. 12A is opened on the display device of the PC 1 as noted above, and the user selects, via the collective synchronization instruction screen, a desired direction of synchronization, i.e. from "zone CAD" to "module" or from "module to "zone CAD".

At following step S81, a search is made, on the basis of the ID information of all of the modules (music equipments) in the music LAN 10, for an equipment whose "U_ID" (unique to the equipment) agrees with the "U_ID" among the ID information (i.e., U_ID, HW_ID and SW_ID) of a group of the modules to be subjected to the collective synchronization, listed up on the screen of FIG. 12A, and the searched-out equipment of the "U_ID" is allocated to the individual modules to be subjected to the collective synchronization. If there is no equipment, in the music LAN 10, whose "U_ID" agrees with the "U_ID" among the ID information, and if any module with no equipment allocated thereto (hereinafter "non-allocated module") is included in the group of the modules to be subjected to the collective synchronization ("YES" at step S82), then a search is made, on the basis of the ID information of all of the modules (music equipments) in the music LAN 10, for an equipment whose "HW_ID" (unique to the particular type of the equipment) agrees with the "HW_ID" of the non-allocated module, and the thus-searched-out equipment of the "HW_ID" is allocated to the non-allocated module.

If there is no equipment, in the music LAN 10, whose "HW_ID" agrees with the "HW_ID" among the ID information, and if there is any non-allocated module in the group of the modules to be subjected to the collective synchronization ("YES" at step S84), then a substitutional allocation process of FIG. 22B is carried out at step S85.

At step S91 of FIG. 22B, on the basis of the ID information "HW_ID" identifying the type of each music equipment, ID information "SW_ID" identifying the function of each music equipment and the "HW_ID" or "SW_ID" of the non-allocated module, a search is made, through the individual music equipments in the music LAN 10, for any equipment which is capable of performing the functions of the non-allocated module in place of, i.e. as a substitute equipment for, the non-allocated module (hereinafter "substitutional performance"). Here, the "equipment which is capable of performing the functions of the non-allocated module as a substitute equipment for the non-allocated module" is a device having functions equivalent to or greater (or higher) than the functions of the non-allocated module. If the non-allocated module is, for example, an effector, the "device having greater functions" is another effector of higher functions than the non-allocated module, in which case all functions (including a function for imparting an effect to a tone and a function for communicating in the music LAN) of the non-allocated module can be performed by the other effector (i.e., "device having greater functions") as a substitute for the non-allocated module. Further, if the non-allocated module is a mixer, the "device having greater functions" is another mixer having greater numbers of channels and buses than the non-allocated module, in which case every mixing processing performed in the non-allocated module can be performed by the "device having greater functions". Further, the "device having greater functions" may be an engine capable of implementing an S module equivalent to an effector or mixer (in terms of the capability and resources), in which case, the "device having greater functions" can perform the functions of the effector or mixer as a substitute for the non-allocated module. Even when there is no equipment, in the music LAN 10, whose ID agrees with the HW_ID of the integrated CAD software or which is capable of substituting for the device specified by the HW_ID although the ID of the equipment does not agree with the HW_ID of the integrated CAD software, an engine capable of implementing an S module, specified by "SW_ID" and equivalent in function to the module implemented by device specified by the HW_ID, can be made the substitute equipment. If any equipment capable of performing the functions of the non-allocated module, such as an equipment having functions equivalent to the functions of the non-allocated module or an engine or the like still having available arithmetic resources, has been found in the music LAN 10 (YES determination at step S92), the user is prompted, through, for example, a suitable confirmation screen, to confirm whether substitutional allocation of the equipment is agreeable ("OK"), and, upon completion of the confirmation by the user (YES determination at step S94), such an alternative or substitute equipment is allocated to the non-allocated module at step S95.

If there is still any non-allocated module ("YES" determination at step S96) even after the substitutional allocation operations of steps S91-S95 above because no equipment capable of performing the functions of the non-allocated module as a substitute for the non-allocated module is present in the music LAN 10 (NO determination at step S92), the functions of the non-allocated module can be performed by an S module, implemented by the PC 1, as a substitute for the non-allocated module. At step S97, the user is prompted, through, for example, a suitable confirmation screen displayed on the display device of the PC 1, to confirm whether the substitutional performance, by the PC 1, of the functions of the non-allocated module is agreeable ("OK"). If the user has agreed to the substitutional performance by the PC 1 (YES determination at step S98), an S module corresponding to the non-allocated module is newly allotted, at step S99, in the PC 1 through the "process for allotting the new S module to the PC 1" explained above in relation to FIG. 19C. If the new S module has been successfully allotted to the PC 1 (YES determination at step S100), the new S module, newly allotted to the PC 1, is allocated to the non-allocated module at step S101. If the user has not agreed to the substitutional performance by the PC 1 (NO determination at step S98), or if the new S module has not been successfully allotted to the PC 1 (NO determination at step S100), an appropriate error operation is carried out at step S102, for example, to open a screen indicating that there remains a non-allocated module. Here, arrangements may be made to inform the user of results of the allocation, to the individual modules to be subjected to the collective synchronization, of the individual equipment by displaying the allocation results on the display device of the PC 1, and to change the allocation in accordance with an instruction by the user.

Once the allocation to the individual modules to be subjected to the collective synchronization process has been determined, an appropriate one of the modules, which is to be first subjected to the collective synchronization, is designated at step S86 of FIG. 22A. Then, after it has been ascertained, at step S87, that some music equipment has been allocated to the designated module, the collective synchronization process is carried out at step S88 in the user-designated direction of synchronization. Namely, data are transmitted in the user-designated direction of synchronization between the PC and the music equipment to which the designated module has been allocated, so as to achieve agreement between the stored contents of the working area for the module in the integrated CAD working memory and the stored contents of the working memory for the music equipment to which the designated module has been allocated. The data to be synchronized here comprise not only the various operational data but also the logical connection data as set forth above in relation to FIG. 8. If the allocated music equipment is an equipment specified by the U_ID in the integrated CAD software or an equipment equivalent to (i.e., having the same hardware ID as) such an equipment, the respective operational data and logical connection data of the integrated CAD software and of the equipment agree with each other in data structure, and thus, the operational data and logical connection data may be transmitted as they are; otherwise (i.e., the allocated music equipment is a substitute equipment), an appropriate addition process has to be performed in accordance with the type of the module or equipment to be subjected to the synchronization. For example, when the data are to be transmitted from the integrated CAD software to the music equipment, and if the allocated music equipment is the above-mentioned "device having greater functions", the integrated CAD software and the allocated music equipment differ from each other in data structure of the operational data and logical connection data, and thus, the data transmission is carried out while being converted into a greater structure of the operational data and logical connection data of the music equipment (i.e., device having greater functions). If the allocated music equipment is an engine capable of implementing an equivalent S module, the equivalent S module is activated by the engine prior to the data transmission, and then the transmission of the operational data and logical connection data is executed after storage regions corresponding to the S module is created in the working memory of the engine. In any case, the logical connection data can not be used as they are, and thus, the logical connection data are converted as necessary in accordance with conditions of the equipment to which the data are to be transmitted, to allow the logical connection of the S module to agree with the logical connection of the module of the transmitted-to or receiving equipment specified by the U_ID. If the PC 1 substitutes for the non-allocated module, storage regions provided, in the integrated CAD software, for the operational data and logical connection data of the equipment may be used as they are, as storage regions for the equivalent S module, to activate the equivalent S module in the PC 1. The S module performs local operations rather than remote-controlled operations. Alternatively, the equivalent S module may be activated so as to use other storage regions, and the operational data and logical connection data may be copied to such other storage regions so that remote control is performed within the PC 1.

Then, another module to be next subjected to the synchronization process is designated at step S89, and if such a other module has been designated (YES determination at step S90), the operations of steps S87-S89 above are performed on the other module. In this way, the synchronization process is performed on all of the modules to be subjected to the collective synchronization (typically, all of the modules in the music LAN 10).

In the above-described embodiment, the integrated CAD software of the PC 1 and the individual equipments in the music LAN 10 are arranged to be switched over to the online state after the collective synchronization process of FIG. 22 has been performed in response to user's operation of the collective synchronization instruction button 34. In the online state, any change in one of the integrated CAD software of the PC 1 and the equipments in the music LAN 10 is transferred to the other in such a manner that the contents of the individual "currents" and "libraries" corresponding to the modules of the integrated CAD working memory (in the PC 1) and the contents of the individual "currents" and "libraries" corresponding to the modules in the equipments 2-6 are constantly synchronous with each other. Namely, inputting/setting operation performed by the user via the integrated CAD screen and inputting/setting operation performed by the user on the operation panels of the equipments 2-6 are reflected in real time in the corresponding "currents" and "libraries" of both the integrated CAD working memory and the equipments 2-6 (see, for example, FIGS. 16-18).

Further, in the instant embodiment, the integrated CAD software of the PC 1 and the equipments 2-6 in the music LAN 10 are synchronized with each other so that the contents of the equipment-specific scene memories in the integrated CAD working memory of the PC 1 (see (a) of FIG. 11) and the contents of the scene memories provided in the individual equipments in the music LAN 10 are constantly synchronized with each other in the above-described manner. Further, when, in the online state, the direction of synchronization is from the PC to the equipments 2-6, collective scene store/recall control of the individual equipments by the PC 1 (i.e., integrated CAD working memory) is reflected in real time in each of the equipments in the music LAN 10, so that the scene store/recall control of the individual equipments 2-6 can be managed in a collective fashion. As described above, with the arrangement that the integrated CAD software of the PC 1 collectively manages not only the operational data but also the logical connection data of the individual equipments, the scene store/recall control can be performed collectively for the plurality of equipments 2-6.

According to the instant embodiment having so far been described, store and recall control of a scene including the operational data and logical connection data can be performed collectively for the plurality of equipments in the music LAN 10.

Whereas the processes for moving an S module from the PC 1 to an engine and for moving an S module from an engine to the PC 1 have been described with reference to the flow chart of FIG. 20, also conceivable is a case where an S module is moved from one engine to another engine. In this case, what should be done is to first perform the operation of step S49 on the moved-from engine and then perform the operation of step S47 on the moved-to engine. Alternatively, feasibility may be first tested as to activation in the moved-to engine and connection to the activated S module. If feasible, operations may be performed to instruct the moved-to engine to activate the S module and make a necessary connection to the activated S module and to instruct the moved-from engine to delete the connection to the S module and deactivate the S module; in this way, the S module can be moved directly to another engine without requiring temporary movement to the PC 1 during movement to an ultimate destination engine.

Further, to the embodiment of the integrated CAD software, there may be added an function (plug and play function) for, in response to a user instruction, scanning the Music LAN to detect any equipment which is currently connected to the music LAN but for which an icon of a module corresponding thereto has not yet been placed on the integrated CAD screen and then automatically placing the icon of the module corresponding to the detected equipment. With the automatic placement function (plug and play function), only connecting a new equipment to the music LAN can additionally place the icon of the module, corresponding to the new equipment, on the integrated CAD screen, and thus, it is possible to eliminate extra user operation for selecting and placing the icon of the corresponding module on the screen.

Further, the embodiment has been described as receiving a user instruction, via the confirmation screen of FIG. 12A, about a desired direction of synchronization (or instruction about a data transmission direction) when the synchronization is to be carried out, the synchronization may be carried out without receiving such a direction instruction. For example, there may be provided two synchronization instruction buttons 34 in corresponding relation to the directions of synchronization so that the user can select any one of the synchronization instruction buttons 34 in accordance with his or her desired direction of synchronization. Alternatively, there may be provided only one synchronization instruction button 34 for instructing synchronization in only one of the directions.

Furthermore, as another example of the synchronization direction instruction, a direction of synchronization may be automatically determined after user's operation of the synchronization instruction button 34. For example, a determination may be made, for each module, as to which one of the updating of the working memory in the PC 1 and the updating of the working memories of the equipments in the music LAN has taken place more recently than the other, and then synchronization (data transmission) may be carried out in a direction from one of the PC 1 and music equipments, having more-recently updated data (i.e., newer data), to the other of the PC 1 and music equipments. Furthermore, when synchronization is to be carried out in the direction from the music equipments to the integrated CAD software (PC 1), the configuration (H and S modules) of the music equipments and the operational data and logical connection data as well of each of the equipment may be read directly to the integrated CAD software.

What is claimed is:

1. A music system comprising a plurality of devices connected together via a network and a control apparatus that remote-controls respective settings of the plurality of devices via the network, at least one of the plurality of devices including an engine capable of implementing a software module, said control apparatus comprising:

memory storing respective settings of said devices;

an allocation section that allocates the respective settings of said plurality of devices to corresponding ones of said devices in said music system, wherein said allocation section makes a search for any engine capable of implementing a software module equivalent in function to a particular device and allocates the settings of the particular device to the engine capable of substituting for the particular device; and a synchronization processing section that performs a synchronization process to cause the respective settings of said plurality of devices stored in said memory to correspond with the respective settings of the corresponding devices in said system, to which the respective settings are allocated by said allocation section, wherein the synchronization is performed so as to cause the settings of the engine capable of substituting for the particular device, allocated as a substitute for the particular device, to correspond with the settings of the particular device.

2. A music system as claimed in claim 1 wherein said allocation section presents a result of the search and prompts the user to confirm whether the searched-out engine, capable of substituting for the particular device, is acceptable as a substitute for the particular device, and, when the user has confirmed that the searched-out engine, is acceptable, said allocation section allocates the settings of the particular device to the searched-out engine, capable of substituting for the particular device.

3. A music system as claimed in claim 1 wherein the settings of each of said devices, stored in the memory for the device, include a data set for setting an operational condition of said device and a data set for setting a logical connection between said device and another one of said devices, whereby said synchronization processing section can perform the synchronization on each of said devices in terms of not only the operational condition and but also the logical connection with another one of said devices.

4. A music system as claimed in claim 1 wherein each of said plurality of devices has an ID for identifying the device, and a plurality of the IDs for identifying individual ones of the plurality of devices that should reside in said music system are stored in said memory, and wherein said allocation section detects agreement between respective IDs of said plurality of devices and the plurality of the IDs stored in said memory, to thereby allocate respective settings of the plurality of devices, stored in said memory, to corresponding ones of said devices in said music system.

5. A music system as claimed in claim 4 wherein said ID is a unique ID that uniquely identifies one of said devices.

6. A music system as claimed in claim 4 wherein said ID is a module ID that uniquely identifies one of modules provided by said devices.

7. A music system as claimed in claim 5 wherein said allocation section searches for the engine capable of substituting for the particular device, on the basis of the IDs of the individual devices in said music system and the ID of the particular device.

8. A music system as claimed in claim 1 wherein said engine capable of substituting for the particular device is a device, other than the particular device, which has a same type of function as the particular device, and the other device has a higher function than the particular device.

9. A music system as claimed in claim 1 which further comprises a module execution section that executes a software module, and wherein, when any of the respective settings of the plurality of devices stored in said memory could not be allocated even through the allocation by said allocation section, said module execution section executes a software module equivalent to the device corresponding to the setting.

10. A non-transitory computer readable medium containing a group of instructions for causing a computer of a control node to perform, in a music system comprising a plurality of devices connected together via a network and the control node, a procedure for remote-controlling settings of the plurality of devices via the network, at least one of the plurality of devices including an engine capable of implementing a software module, said procedure comprising:

a step of establishing memory storing respective settings of the devices;

a step of allocating the respective settings of said plurality of devices, to corresponding ones of said devices in said music system, making a search for any engine capable of implementing a software module equivalent in function to a particular device, and allocating the settings of the particular device to the engine capable of substituting for the particular device; and a step of performing a synchronization process to cause the respective settings of said devices stored in said memory to correspond with the respective settings of the corresponding devices in said system, to which the respective settings are allocated, wherein the synchronization is performed so as to cause the settings of the engine capable of substituting for the particular devices, allocated as a substitute for the particular device, to correspond with the settings of the particular devices.

11. A music system comprising a plurality of devices connected together via a network and a control apparatus that remote-controls respective settings of the plurality of devices via the network, said control apparatus comprising:

a module execution section that executes a software module formed by software to perform a predetermined function;

memory storing respective settings of the devices;

an allocation section that allocates the respective settings of said plurality of devices, to corresponding ones of said devices in said music system, wherein said allocation section causes said module execution section to activate a software module for implementing a function of a particular device and allocates the settings of the particular device to the activated software module capable of substituting for the particular device; and a synchronization processing section that performs a synchronization process to cause the respective settings of said devices stored in said memory to correspond with the respective settings of the corresponding devices in said system, to which the respective settings are allocated by said allocation section, wherein the synchronization is performed so as to cause the settings of the activated software module capable of substituting for the particular device, allocated as a substitute for the particular device, to correspond with the settings of the particular device.

* * * * *